US011079900B2

(12) United States Patent
Yeo et al.

(10) Patent No.: US 11,079,900 B2
(45) Date of Patent: Aug. 3, 2021

(54) ELECTRONIC DEVICE AND COMPUTER PROGRAM PRODUCT FOR CONTROLLING DISPLAY OF INFORMATION BASED ON DISPLAY AREAS OF FLEXIBLE DISPLAY

(71) Applicant: Samsung Electronics Co., Ltd., Suwon-si (KR)

(72) Inventors: Junghee Yeo, Seoul (KR); Hayoul Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/067,347

(22) PCT Filed: Jan. 12, 2017

(86) PCT No.: PCT/KR2017/000400
§ 371 (c)(1),
(2) Date: Jun. 29, 2018

(87) PCT Pub. No.: WO2017/123016
PCT Pub. Date: Jul. 20, 2017

(65) Prior Publication Data
US 2019/0026008 A1    Jan. 24, 2019

(30) Foreign Application Priority Data

Jan. 12, 2016  (KR) .......................... 10-2016-0003804

(51) Int. Cl.
*G06F 3/0481*  (2013.01)
*G06F 1/16*    (2006.01)
(Continued)

(52) U.S. Cl.
CPC ........ *G06F 3/04817* (2013.01); *G06F 1/1626* (2013.01); *G06F 1/1652* (2013.01);
(Continued)

(58) Field of Classification Search
CPC .. G06F 3/04886; G06F 1/1605; G06F 3/0484; G06F 13/10; G06F 3/04817;
(Continued)

(56) References Cited

U.S. PATENT DOCUMENTS 10,133,394 B2 * 11/2018 Kim .................. H04M 1/72583
2009/0164930 A1 * 6/2009 Chen ..................... G06F 3/0412
715/769
(Continued)

FOREIGN PATENT DOCUMENTS

CN    101739171 A    6/2010
CN    103309573 A    9/2013
(Continued)

OTHER PUBLICATIONS

Troy Rubenson, 'Iphone 6 Release Date,'URL: http://stateschronicle.com/tag/iphone-6-concept, Aug. 21, 2013.
(Continued)

*Primary Examiner* — Nicholas Ulrich
(74) *Attorney, Agent, or Firm* — Jefferson IP Law, LLP

(57) ABSTRACT

The present invention comprises a flexible display that surrounds the front surface of an electronic device and a control unit that controls operation of functions of the flexible display-based electronic device. The control unit may display a plurality of icons corresponding to an application or a specific function in at least one area among sub areas of the flexible display; the control unit may sense an input for selecting at least one icon among the plurality of icons; the control unit may sense an input for swiping the at least one selected icon to at least one area among main areas of the flexible display; and the control unit may process a control such that an application or a specific function, which corresponds to the at least one selected icon, is executed, and
(Continued)

a screen corresponding to the execution is displayed in the main area corresponding to the sensed swipe input.

19 Claims, 29 Drawing Sheets

(51) Int. Cl.
    *G06F 3/0484* (2013.01)
    *G06F 3/0488* (2013.01)
    *G06F 3/0486* (2013.01)
    *G06F 3/0482* (2013.01)
    *H04M 1/02* (2006.01)

(52) U.S. Cl.
    CPC .......... *G06F 3/0481* (2013.01); *G06F 3/0482* (2013.01); *G06F 3/0484* (2013.01); *G06F 3/0486* (2013.01); *G06F 3/0488* (2013.01); *G06F 3/04842* (2013.01); *G06F 3/04883* (2013.01); *G06F 3/04886* (2013.01); *H04M 1/0268* (2013.01); *G06F 2200/1631* (2013.01)

(58) Field of Classification Search
    CPC .... G06F 3/04847; G06F 3/14; G06F 3/04883; G06F 3/04842; G06F 3/0488; G06F 3/0482; G06F 1/1618; G06F 1/1652; G06F 3/0486; G06F 3/0481; G06F 1/1626; G06F 2200/1631; G09G 2380/02; H04N 13/366; H04N 13/368; H04N 13/39; H04N 13/395; H04N 5/23219; H04N 5/2257; H04N 5/23293; H04N 21/4882; H04N 21/8133; H04N 5/2256; H04N 5/64; H04N 5/642; H04M 1/0268
See application file for complete search history.

(56) References Cited

U.S. PATENT DOCUMENTS

| | | | |
|---|---|---|---|
| 2010/0033498 A1* | 2/2010 | Terasaki | G09G 3/20 345/617 |
| 2010/0117975 A1 | 5/2010 | Cho | |
| 2010/0328191 A1* | 12/2010 | Smith | G06F 1/1626 345/1.3 |
| 2011/0128241 A1* | 6/2011 | Kang | G06F 3/0488 345/173 |
| 2013/0076649 A1* | 3/2013 | Myers | H04M 1/0268 345/173 |
| 2013/0300697 A1* | 11/2013 | Kim | G06F 1/1626 345/173 |
| 2014/0267091 A1* | 9/2014 | Kim | G06F 3/041 345/173 |
| 2014/0351748 A1* | 11/2014 | Xia | G06F 3/0481 715/798 |
| 2015/0015511 A1 | 1/2015 | Kwak et al. | |
| 2015/0015512 A1* | 1/2015 | Kwak | G06F 3/0412 345/173 |
| 2015/0121263 A1 | 4/2015 | Yeh | |
| 2015/0227227 A1 | 8/2015 | Myers et al. | |
| 2016/0004376 A1* | 1/2016 | Mitsunaga | G06F 1/1684 345/173 |
| 2017/0097715 A1 | 4/2017 | Kim et al. | |
| 2019/0026008 A1 | 1/2019 | Yeo et al. | |

FOREIGN PATENT DOCUMENTS

| | | |
|---|---|---|
| CN | 104885036 A | 9/2015 |
| EP | 3 388 932 A1 | 10/2018 |
| KR | 10-2015-0016402 A | 2/2015 |
| KR | 10-2015-0112239 A | 10/2015 |
| KR | 10-2016-0000110 A | 1/2016 |

OTHER PUBLICATIONS

Chinese office Action dated Nov. 24, 2020, issued in Chinese Application No. 201780006441.4.
Australian office Action dated Apr. 28, 2021, issued in Australian Patent Application No. 2017206466.

* cited by examiner

FIG. 23A
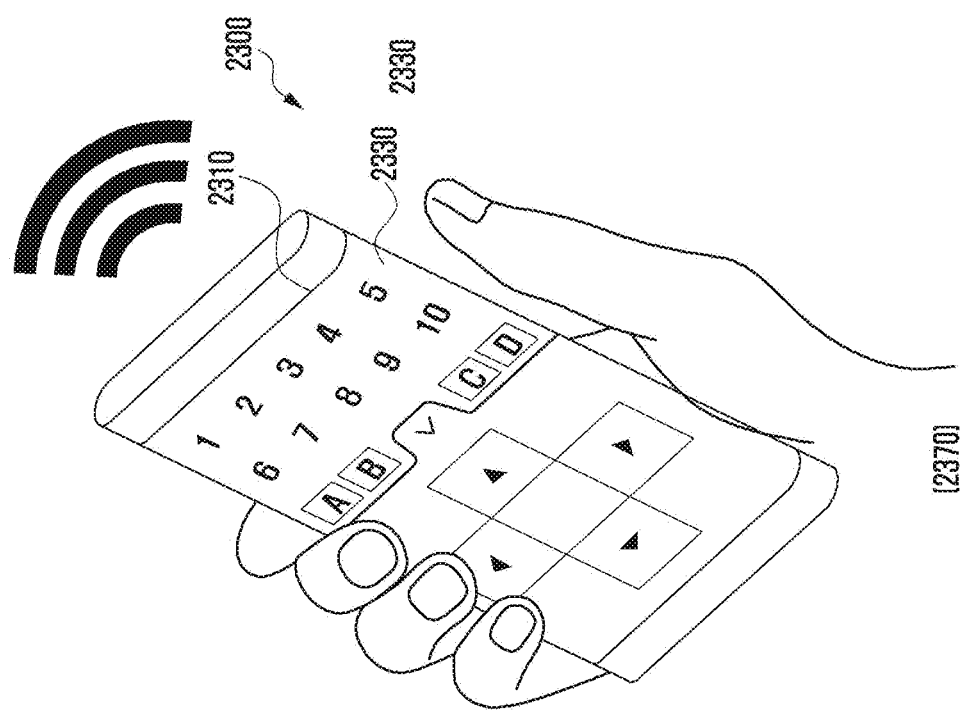
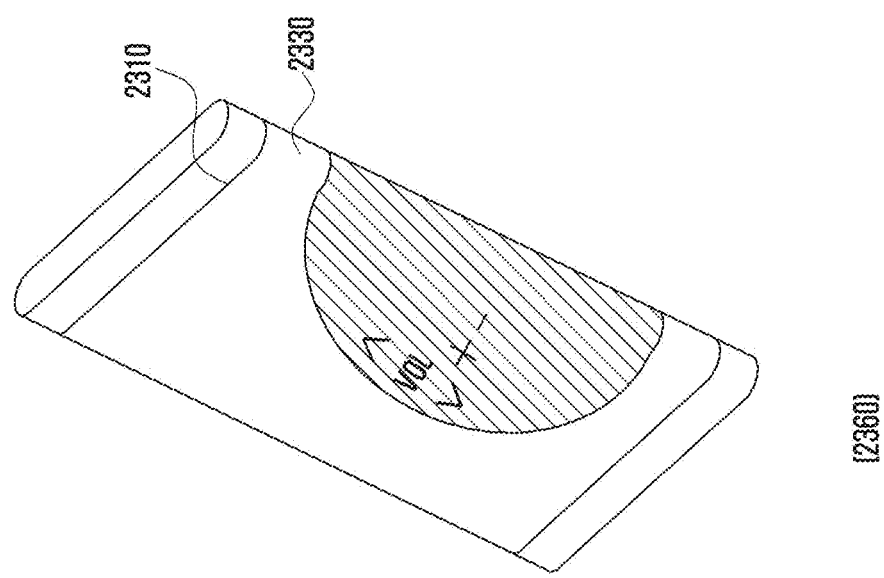

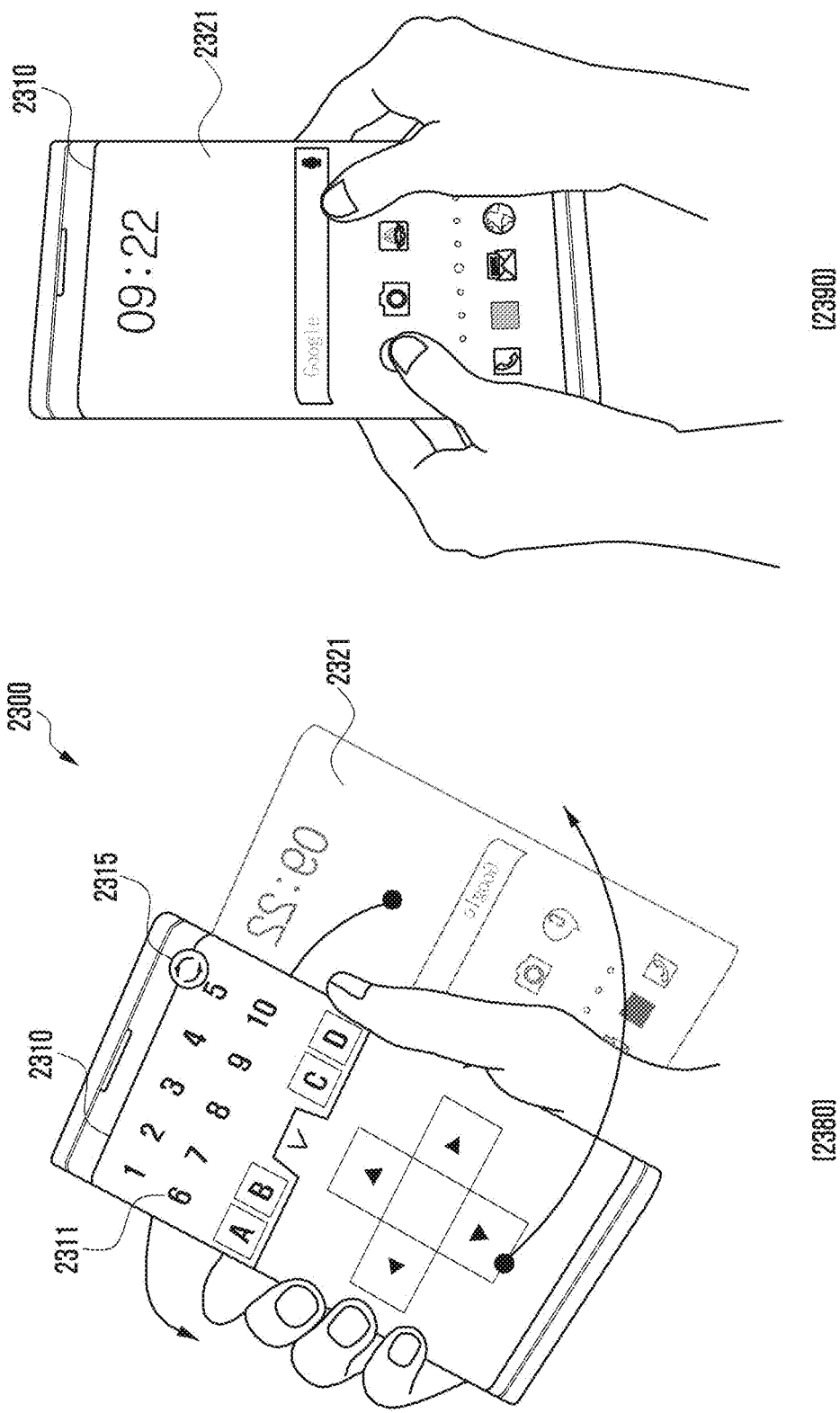

ELECTRONIC DEVICE AND COMPUTER PROGRAM PRODUCT FOR CONTROLLING DISPLAY OF INFORMATION BASED ON DISPLAY AREAS OF FLEXIBLE DISPLAY

TECHNICAL FIELD

Various embodiments of the present invention relate to a flexible display of an electronic device and a method of operating the same.

BACKGROUND ART

Nowadays, with the development of digital technology, various mobile terminals capable of processing communication and personal information while moving, such as a mobile communication terminal, personal digital assistant (PDA), electronic organizer, smart phone, and tablet personal computer (PC), have been released. The mobile terminals are in a mobile convergence step that can perform functions of other terminals as well as original functions thereof.

Recently, a flexible display and an electronic device having a flexible display implemented by a combination of the flexible display and the electronic device have been developed. The flexible display indicates a display that can freely bend and spread.

In particular, nowadays, research and development of an electronic device having a flexible display has been performed. Therefore, there is necessity for development in an external shape of the electronic device having a flexible display and a research for improving convenience of a function control of an electronic device using the flexible display mounted in the electronic device.

DISCLOSURE OF INVENTION

Technical Problem

The present invention provides an electronic device and a method of operating a function thereof that can extend a display area to a side surface and a rear surface as well as a front surface of the electronic device by implementing a flexible display in the electronic device.

The present invention further provides an electronic device and a method of operating a function thereof that can divide a flexible display into a main area of a front surface and a rear surface and a sub-area of a side surface and that can support a function control and a function display of the electronic device using the sub-area in the electronic device having the flexible display.

The present invention further provides an electronic device and a method of operating a function thereof that can support easy and quick access to information related to a screen displayed in a main area using a sub-area of the flexible display and that can enhance usability and operability of a user for a function control of the electronic device using a sub-area.

Solution to Problem

In accordance with an aspect of the present invention, an electronic device includes a flexible display configured to enclose an front surface of the electronic device; and a controller configured to control an electronic device function operation based on the flexible display, wherein the controller controls to display a plurality of icons corresponding to an application or a specific function in at least one area of sub-areas of the flexible display, to detect an input for selecting at least one icon of the plurality icons, to detect a swipe input of the selected at least one icon in at least one area of main areas of the flexible display, to execute the application or the specific function corresponding to the selected at least one icon, and to display a screen according to the execution in the main area in which the swipe input is detected.

Advantageous Effects of Invention

In a flexible display of an electronic device and a method of operating the same according to various embodiments, by using a display extended to a side surface of the electronic device, utilization of the electronic device can be increased.

In a flexible display of an electronic device and a method of operating the same according to various embodiments, by controlling a front surface and a rear surface of the electronic device through a display extended to a side surface of the electronic device, convenience can be provided to the user.

In a flexible display of an electronic device and a method of operating the same according to various embodiments, when the flexible display is interworked or connected with an external electronic device, the electronic device can easily control the external electronic device through a graphical user interface (GUI) provided in the electronic device.

BRIEF DESCRIPTION OF DRAWINGS

FIGS. 23A and 23B are diagrams illustrating an electronic device having a flexible display according to various embodiments.

MODE FOR THE INVENTION

Figure 1:
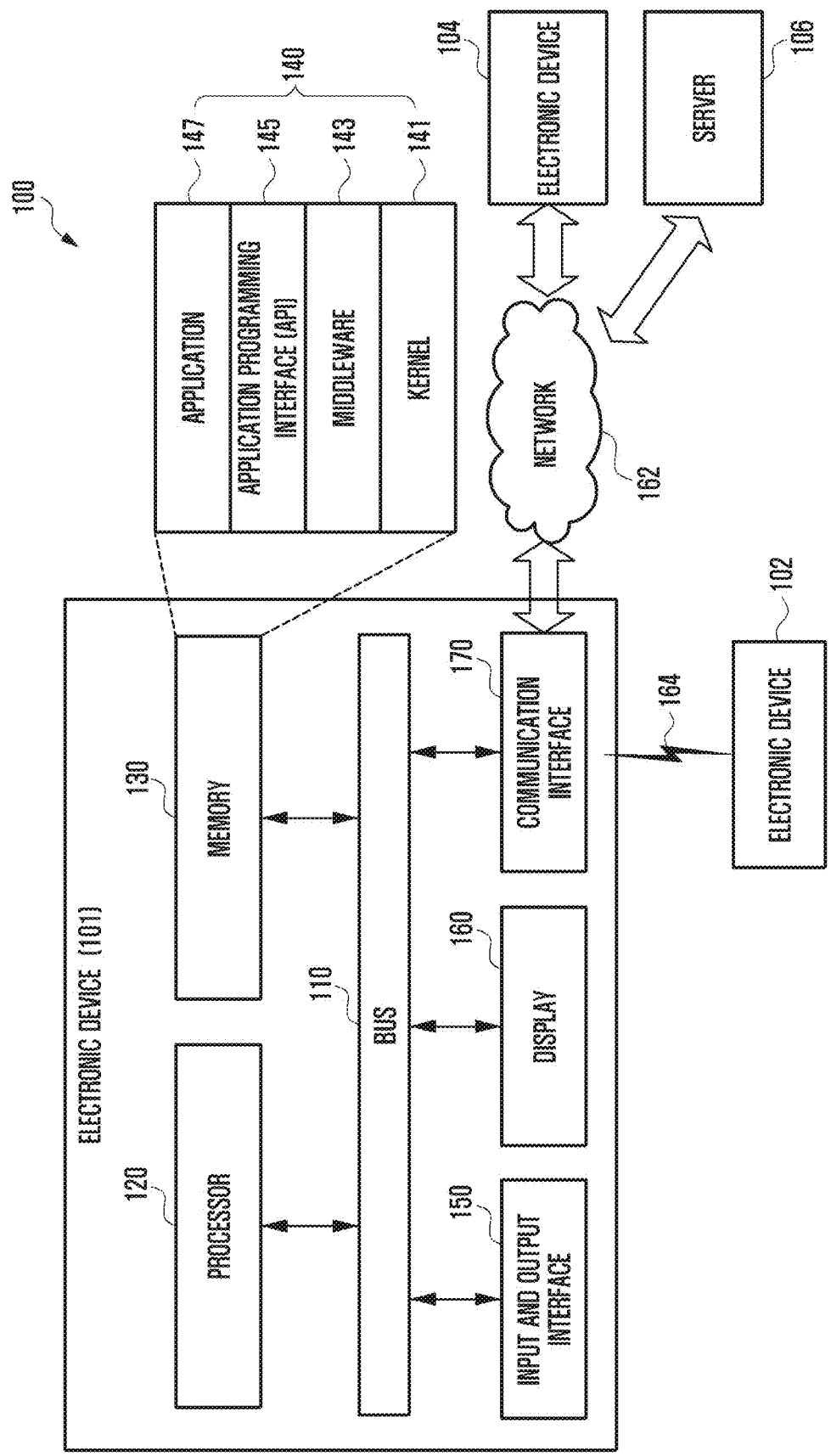
FIG. 1 is a block diagram illustrating a configuration of an electronic device in a network environment according to various embodiments.

Hereinafter, various embodiments of this document will be described with reference to the accompanying drawings. However, it should be understood that technology described in this document is not limited to a specific embodiment and includes various modifications, equivalents, and/or alternatives of an embodiment of this document. The same reference numbers are used throughout the drawings to refer to the same or like parts.

In this document, an expression such as "have," "may have," "comprise," or "may comprise" indicates existence of a corresponding characteristic (e.g., constituent element such as a numerical value, function, operation, or component) and does not exclude the presence of another characteristic.

In this document, an expression such as "A or B", "at least one of A or/and B", or "one or more of A or/and B" may include all possible combinations of together listed items. For example, "A or B," "at least one of A and B," or "one or more of A or B" may indicate all of (1) a case of including at least one A, (2) a case of including at least one B, and (3) a case of including both at least one A and at least one B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An expression "configured to" used in this document may be interchangeably used with, for example, "suitable for", "having the capacity to", "designed to", "adapted to", "made to", or "capable of" according to a situation. A term "configured to" does not always mean "specifically designed to" in hardware. Alternatively, in any situation, an expression "device configured to" may mean that the device is "capable of" being configured together with another device or component. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

Terms used in this document are used for describing a specific embodiment and do not limit a range of another embodiment. Unless the context otherwise clearly indicates, words used in the singular include the plural, and the plural includes the singular. Terms used here including a technical or scientific term have the same meaning as that which may be generally understood by a person of common skill in the art. Terms defined in a general dictionary among terms used in this document may be analyzed as the same meaning as or a meaning similar to that in a context of related technology, and unless it is clearly defined in this document, the term is not analyzed as having an ideal or excessively formal meaning. In some cases, a term defined in this document cannot be analyzed to exclude the embodiments of this document.

An electronic device according to various exemplary embodiments of the present invention may be a device including a communication function. For example, the electronic device may include at least one of a smart phone, tablet personal computer (PC), mobile phone, video phone, e-book reader, desktop PC, laptop PC, netbook computer, personal digital assistant (PDA), portable multimedia player (PMP), MPEG 3 (MP3) player, mobile medical equipment, camera, wearable device (e.g., head-mounted-device (HMD) such as electronic glasses), electronic clothing, electronic bracelet, electronic necklace, electronic accessory, electronic tattoo, and smart watch.

In any embodiment, the electronic device may be a smart home appliance. The smart home appliance may include at least one of, for example, a television, digital video disk (DVD) player, audio device, refrigerator, air-conditioner, cleaner, oven, microwave oven, washing machine, air cleaner, set-top box, home automation control panel, security control panel, television box (e.g., Samsung HomeSync™, AppleTV™, or Google TV™), game console (e.g., Xbox™, PlayStation™), electronic dictionary, electronic key, camcorder, and electronic frame.

In another embodiment, an electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MRI) device, computed tomography (CT) device, scanning machine, and ultrasonic wave device), navigation device, global positioning system (GPS) receiver, event data recorder (EDR), flight data recorder (FDR), vehicle infotainment device, ship electronic equipment (e.g., ship navigation device, gyro compass), avionics, security device, vehicle head unit, industrial or home robot, automatic teller's machine (ATM) of a financial institution, point of sales (POS) of a store, and Internet of things (e.g., bulb, various sensors, electricity or gas meter, sprinkler, fire alarm, thermostat, street light, toaster, exercise mechanism, hot water tank, heater, boiler).

According to any embodiment, the electronic device may include at least one of a portion of furniture or a building/structure, electronic board, electronic signature receiving device, projector, and various measurement devices (e.g., water supply, electricity, gas, or electric wave measurement device). In various embodiments, the electronic device may be a combination of one or more of the foregoing various devices. An electronic device according to any embodiment may be a flexible electronic device. Further, the electronic device according to an embodiment of this document is not limited to the foregoing devices and may include a new electronic device according to technology development.

FIG. 1 is a block diagram illustrating a configuration of an electronic device according to an embodiment of the present disclosure.

Referring to FIG. 1, the electronic device 100 may include a bus 110, a processor 120, a memory 130, a user input module 140, a display module 150, a communication module 160, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the user input module 140, the display module 150, the communication module 160, etc.) through the bus 110, may interpret the received commands, and may execute calculation or data processing according to the interpreted commands.

The memory 130 may store commands or data received from the processor 120 or other elements (e.g., the user input module 140, the display module 150, the communication module 160, etc.) or generated by the processor 120 or the other elements. The memory 130 may include programming modules, such as a kernel 131, middleware 132, an Application Programming Interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, etc.) used to execute operations or functions implemented by other programming modules (e.g., the middleware 132, the API 133, and the application 134). Also, the kernel 131 may provide an interface capable of accessing and controlling or managing the individual elements of the electronic device 100 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith.

Also, in relation to work requests received from one or more applications 134 and/or the middleware 132, for example, may perform load balancing of the work requests by using a method of assigning a priority, in which system resources (e.g., the bus 110, the processor 120, the memory 130, etc.) of the electronic device 100 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The user input module 140, for example, may receive a command or data as input from a user, and may deliver the received command or data to the processor 120 or the memory 130 through the bus 110.

The display 150 may include a liquid crystal display (LCD), a light-emitting diode (LED) display, an organic LED (OLED) display, a microelectromechanical systems (MEMS) display, or an electronic paper display. The display 150 may display, for example, various contents, such as a text, an image, a video, an icon, and a symbol, to a user. The display 150 may include a touch screen and may receive a touch, gesture, proximity, or hovering input using an electronic pen or a part of a user's body.

The communication module 160 may connect communication between another electronic device 102 and the electronic device 100.

The communication module 160 may support a predetermined short-range communication protocol (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 100. Further, the communication module 160 may connect communication between a server 164 and the electronic device 100 via the network 162.

The MST may generate a pulse in response to transmission data using an electromagnetic signal, and the pulse may generate a magnetic field signal. The electronic device 101 may transfer the magnetic field signal to a POS device, and the POS device may detect the magnetic field signal using an MST reader. The POS device may recover the data by converting the detected magnetic field signal to an electrical signal.

The GNSS may be, for example, a GPS, a global navigation satellite system (GLONASS), a BeiDou navigation satellite system (hereinafter, "BeiDou"), or Galileo, which is the European global satellite-based navigation system. In the present document, "GPS" may be interchangeably used with "GNSS" hereinafter. The wired communication may include, for example, at least one of universal serial bus (USB), high definition multimedia interface (HDMI), recommended standard 232 (RS-232), power line communication, and plain old telephone service (POTS).

Each of the first and second external electronic devices 102 and 104 may be a device of which the type is different from or the same as that of the electronic device 101. The server 106 may include a group of one or more servers. According to embodiments of the present disclosure, all or a portion of operations that the electronic device 101 will perform may be executed by another or plural electronic devices, such as the first external electronic device 102, the second external electronic device 104 or the server 106. In the case where the electronic device 101 executes any function or service automatically or in response to a request, the electronic device 101 may not perform the function or the service internally, but alternatively or additionally, it may request at least a portion of a function associated with the electronic device 101 from another device, such as the external electronic device 102 or 104 or the server 106. The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
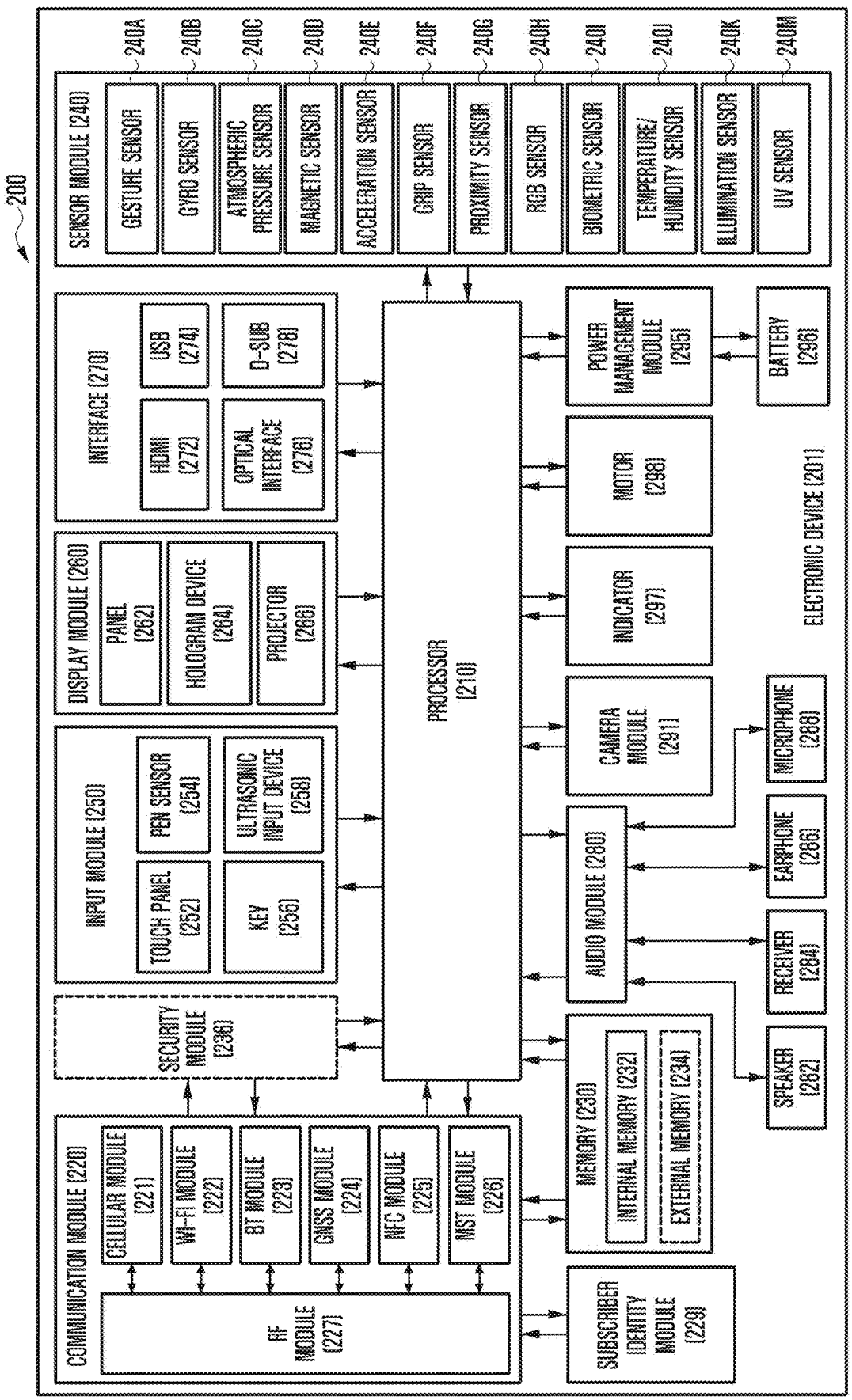
FIG. 2 is a block diagram illustrating a configuration of an electronic device according to various embodiments.

FIG. 2 is a block diagram illustrating a configuration of hardware 200 according to an embodiment of the present disclosure.

The hardware 200 may be, for example, the electronic device 100 illustrated in FIG. 1.

Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio coder/decoder (codec) 280, a camera module 291, a power management module 295, a battery 296, an indicator 297, a motor 298 and any other similar and/or suitable components.

The processor 210 (e.g., the processor 120) may include one or more Application Processors (APs) 211, or one or more Communication Processors (CPs) 213. The processor 210 may be, for example, the processor 120 illustrated in FIG. 1. The AP 211 and the CP 213 are illustrated as being included in the processor 210 in FIG. 2, but may be included in different Integrated Circuit (IC) packages, respectively. According to an embodiment of the present disclosure, the AP 211 and the CP 213 may be included in one IC package.

The AP 211 may execute an Operating System (OS) or an application program, and thereby may control multiple hardware or software elements connected to the AP 211 and may perform processing of and arithmetic operations on various data including multimedia data. The AP 211 may be implemented by, for example, a System on Chip (SoC). According to an embodiment of the present disclosure, the processor 210 may further include a Graphical Processing Unit (GPU) (not illustrated).

The CP 213 may manage a data line and may convert a communication protocol in the case of communication between the electronic device (e.g., the electronic device 100) including the hardware 200 and different electronic devices connected to the electronic device through the network. The CP 213 may be implemented by, for example, a SoC. According to an embodiment of the present disclosure, the CP 213 may perform at least some of multimedia control functions. The CP 213, for example, may distinguish and authenticate a terminal in a communication network by using a subscriber identification module (e.g., the SIM card 214). Also, the CP 213 may provide the user with services, such as a voice telephony call, a video telephony call, a text message, packet data, and the like.

Further, the CP 213 may control the transmission and reception of data by the communication module 230. In FIG. 2, the elements such as the CP 213, the power management module 295, the memory 220, and the like are illustrated as elements separate from the AP 211. However, according to an embodiment of the present disclosure, the AP 211 may include at least some (e.g., the CP 213) of the above-described elements.

According to an embodiment of the present disclosure, the AP 211 or the CP 213 may load, to a volatile memory, a command or data received from at least one of a non-volatile memory and other elements connected to each of the AP 211 and the CP 213, and may process the loaded command or data. Also, the AP 211 or the CP 213 may store, in a non-volatile memory, data received from or generated by at least one of the other elements.

The SIM card 214 may be a card implementing a subscriber identification module, and may be inserted into a slot formed in a particular portion of the electronic device 100. The SIM card 214 may include unique identification information (e.g., Integrated Circuit Card IDentifier (ICCID)) or subscriber information (e.g., International Mobile Subscriber Identity (IMSI)).

The memory 220 may include an internal memory 222 and an external memory 224. The memory 220 may be, for example, the memory 130 illustrated in FIG. 1. The internal memory 222 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 222 may be in the form of a Solid State Drive (SSD). The external memory 224 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 230 may include a wireless communication module 231 or a Radio Frequency (RF) module 234. The communication module 230 may be, for example, the communication module 160 illustrated in FIG. 1. The wireless communication module 231 may include, for example, a Wi-Fi part 233, a BT part 235, a GPS part 237, or a NFC part 239. For example, the wireless communication module 231 may provide a wireless communication function by using a radio frequency. Additionally or alternatively, the wireless communication module 231 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 234 may be used for transmission and reception of data, for example, transmission and reception of RF signals or called electronic signals. Although not illustrated, the RF unit 234 may include, for example, a transceiver, a Power Amplifier Module (PAM), a frequency filter, a Low Noise Amplifier (LNA), or the like. Also, the RF module 234 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 100, and may convert the measured or sensed information to an electrical signal.

Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The user input module 250 may include a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 230, through the communication module 230.

The display module 260 may include a panel 262 or a hologram 264. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, a projector 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC)

chip, a Field-Programmable Gate Array (FPGA), and a programmable-logic device for performing certain operations which have been known or are to be developed in the future.

Figure 3:
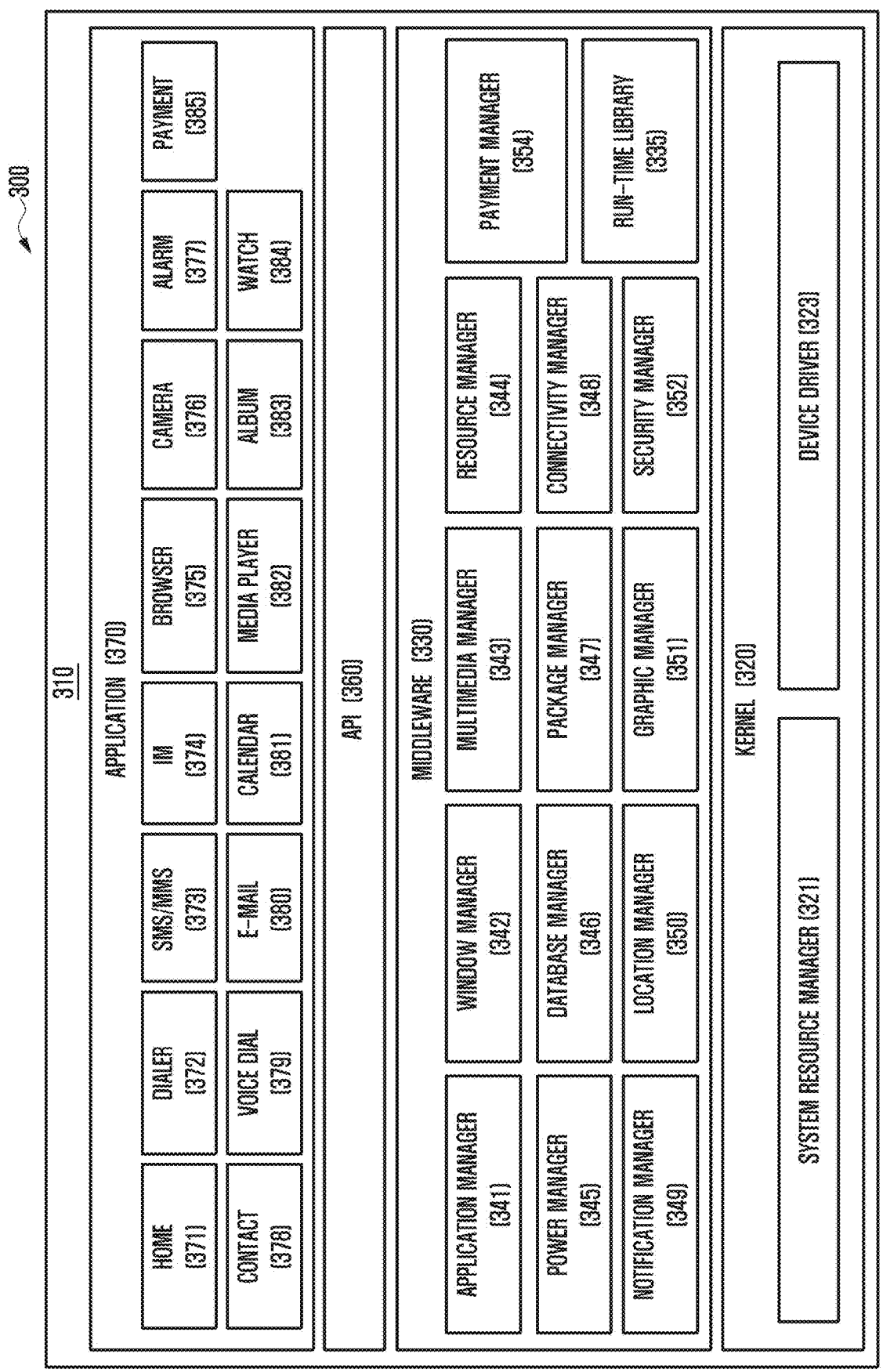
FIG. 3 is a block diagram illustrating a configuration of a program module according to various embodiments.

FIG. 3 is a block diagram illustrating a configuration of a programming module 300 according to an embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

A flexible display of an electronic device and a method of operating the same according to various embodiments of the present invention will be described in detail with reference to FIGS. 4 to 22.

Figure 4:
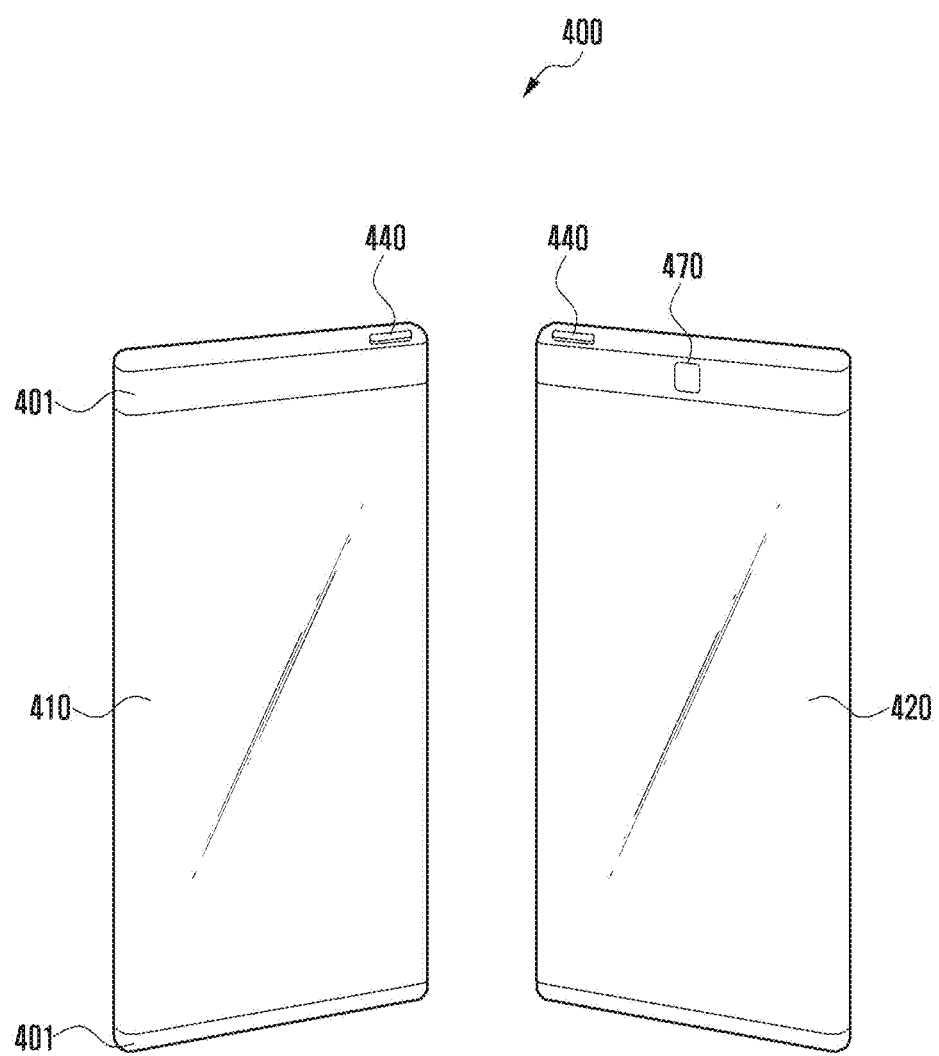
FIG. 4 is a diagram illustrating an electronic device having a flexible display according to various embodiments.
Figure 5:
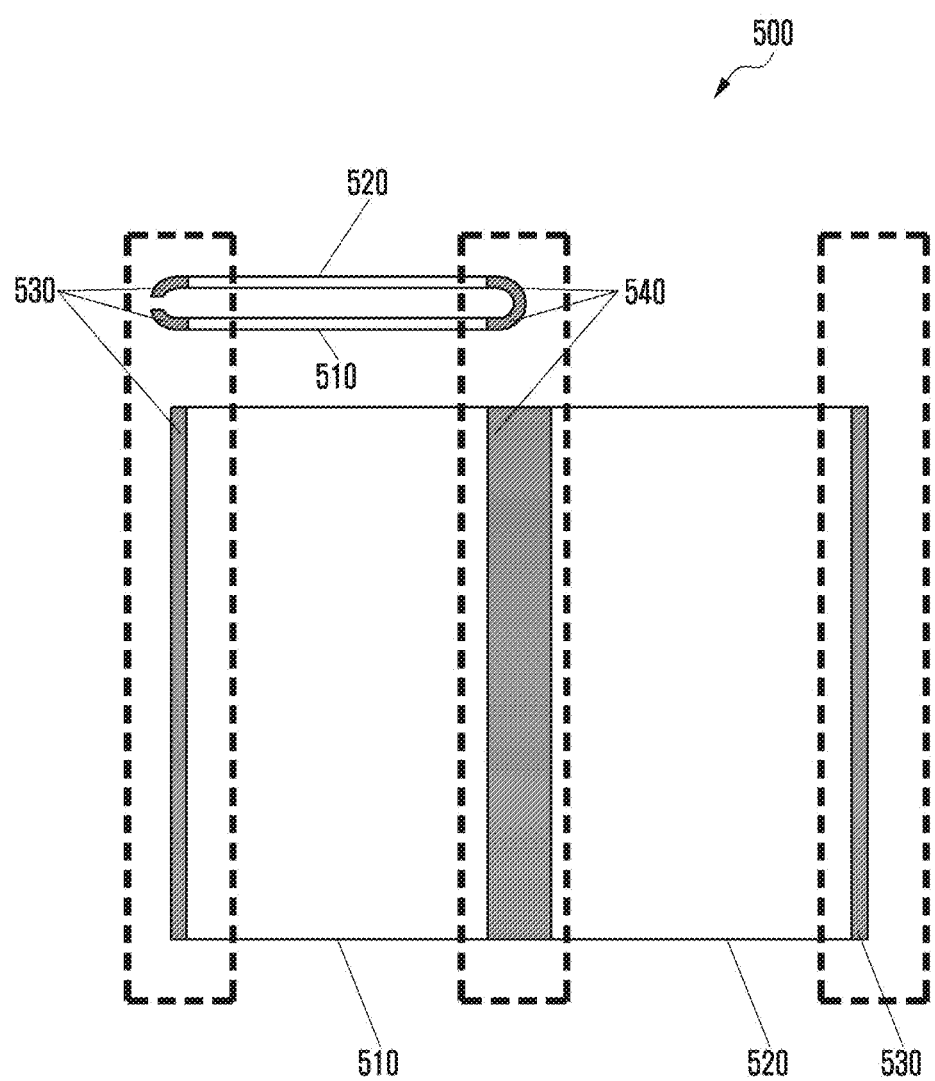
FIG. 5 is a diagram illustrating an electronic device having a flexible display according to various embodiments.

FIGS. 4 and 5 are diagrams illustrating an electronic device having a flexible display according to various embodiments.

The electronic device according to an embodiment of the present invention has a bent display of a form enclosing three surfaces or four surfaces thereof and may include constituent elements such as a flexible display in which a main area of a front surface and a rear surface of the electronic device and a sub-area of a side surface thereof according to such a form are integrally formed, a display for a function of the electronic device and a controller for controlling a function operation by interworking information of the main area and information of the sub-area. In an embodiment of the present invention, in addition to a form of the electronic device of FIGS. 4 and 5, the flexible display of the present invention may be implemented into various forms.

With reference to FIG. 4, an electronic device 400 of the present invention may include a flexible display, a main body 401 in which the flexible display is received and fastened, and additional devices formed in the main body to perform a function of the electronic device 400. The additional devices may include a physical button 401 and a camera 470.

According to various embodiments of the present invention, the flexible display is characterized in that it may be bent or rolled without being damaged through a thin and flexible substrate such as paper. FIG. 4 illustrates partial areas 410 and 420 of the flexible display.

With reference to FIG. 5, in the present invention, areas displayed at a front surface or a rear surface of the flexible display are referred to as main areas 510 and 520 and areas extended from the main areas 510 and 520 and bent in at least one side surface of a main body are referred to as sub-areas 530 and 540.

In the main area according to various embodiments of the present invention, a main area of a front surface may be referred to as a first main area 510 and a main area of a rear surface may be referred to as a second main area 520.

According to various embodiments of the present invention, in a sub-area, an area extended and bent from the first main area 510 and an area extended and bent from the second main area 520 may be referred to as a first sub-area 530. In another embodiment, the first sub-area 530 may be an area in which an area extended and bent from the first main area 510 and an area extended and bent from the second main area 520 are connected.

According to various embodiments of the present invention, in the sub-area, an area extended and bent from the first main area 510 to be extended to the second main area 520 may be referred to as a second sub-area 540.

A position of the first sub-area 530 divided on a flexible display of the electronic device 500 is not limited, and even if a direction of the electronic device 500 is changed to the left/right or up/down by the user, an area is changed in which the first sub-area 530 is positioned, but the first sub-area 530 may be changed while performing the same function (GUI display).

In the first sub-area 530, whenever an executed application is changed, a GUI displayed to correspond thereto may be changed.

When the electronic device 500 is interworked with an external electronic device, the first sub-area 530 may display a GUI that can control a function related to the external electronic device. In an embodiment, the electronic device 500 may be connected or interworked with the external electronic device through 3.5 pie, type-c cable, Bluetooth, WiFi, etc.

The second sub-area 540 may display a plurality of images (e.g., icons) corresponding to an application or a function. The second sub-area 540 may display an icon corresponding to a frequently used application and function by a user input. In the second sub-area 540, the electronic device 500 may detect a user gesture input such as drag and drop to the area to display a plurality of images corresponding to an application or a function in order to immediately use an application or a function. According to an embodiment, a size of the plurality of images may be adjusted according to the number displayed in the second sub-area 540. According to an embodiment, the second sub-area 540 is scrolled; thus, more images may be controlled to display to the user.

According to various embodiments of the present invention, the second sub-area 540 may be a bent area connected to and extended from at least one of the first main area 510 and the second main area 520. The electronic device 500 may detect a user selection input to an icon displayed in the second sub-area 540 and a swipe input to the first main area 510 or the second main area 520. The electronic device 500 may execute an application or a function corresponding to the icon and display a screen related thereto in a determined area among the first main area 510 and the second main area 520 or in an area in which a swipe input is released in a direction in which the swipe input is detected.

Here, for convenience of description of the present invention, the main area and the sub-area are divided, but are not limited thereto.

An electronic device of the present invention may divide a flexible display into a main area of a front surface and a rear surface and a sub-area of a side surface and receive a control input for a function operation of the electronic device and a screen display according to a functional operation of the electronic device using the sub-area. That is, the flexible display may support an input and output and particularly, the flexible display may simultaneously or individually support an input and output to the sub-area. Operation examples according to an input and output by interworking of the main area and the sub-area will be described with reference to the following drawings.

Figure 6:
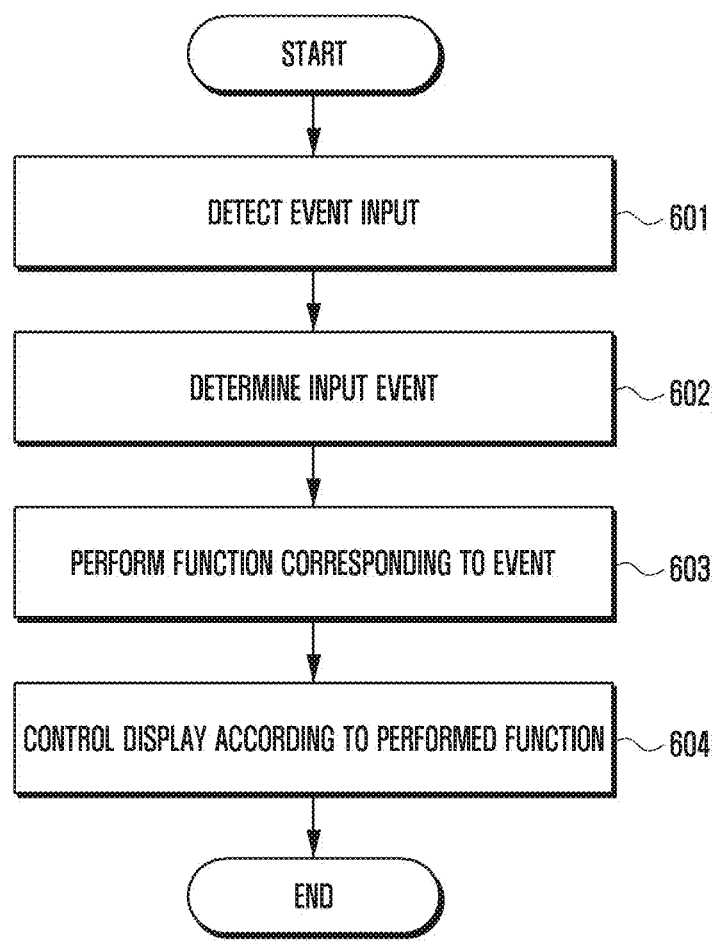
FIG. 6 is a flowchart illustrating an electronic device having a flexible display according to various embodiments.

FIG. 6 is a flowchart illustrating a method of operating a function using a flexible display in an electronic device according to various embodiments.

Before a description of FIG. 6, according to various embodiments of the present invention, the electronic device may detect at least one event of a plurality of events. When the electronic device detects an event, the electronic device may determine an event intended by the user among a plurality of events according to a user input.

According to various embodiments of the present invention, a plurality of events that may be detected by the electronic device may include a function control event, content display event, content storing and sharing event, and screen conversion event.

When an external electronic device is connected to the electronic device or when a user input for performing a specific service is detected in the electronic device, a function control event according to various embodiments of the present invention may be detected.

An external electronic device connected to or interworked with the electronic device according to various embodiments of the present invention may include an IoT product group and other applications or devices requiring pay or control.

According to various embodiments of the present invention, a user interface according to a function control event may be a user interface for providing a function of the connected external electronic device or a specific service. The user interface may be displayed in a first sub-area. The user interface may be changed and displayed according to an interworked device, function, and application. The electronic device may detect a user input on the user interface displayed in the first sub-area and perform a function related to the external electronic device or a specific service or application according to the detected user input.

When a user touch to an icon displayed in the second sub-area and when swipe to a first main area or a second main area is detected, a content display event according to various embodiments of the present invention may be detected. The electronic device, having detected a user input may display a content of an application corresponding to the icon in the first main area or the second main area in which the user input is terminated.

When the electronic device detects a user selection on at least one content displayed on the main area and detects swipe in another main area (e.g., a second main area) other than the main area (e.g., a first main area) in which the content is displayed, a content display event according to various embodiments of the present invention may be detected. Thereby, in another main area (e.g., a second main area), additional information about the selected content may be displayed.

In a content display event according to various embodiments of the present invention, the electronic device may detect an input for executing a specific application or function, and when the specific application or function is executed, the electronic device may display a related screen in the main area and display additional information related to the specific application or function in another main area.

In an embodiment, when the camera is executed, the electronic device may detect a content display event, display a preview image or a photographed image in one main area (e.g., the first main area), and display a gallery in which the photographed image is stored or an image related to the photographed image in another main area (e.g., the second main area).

In an electronic device according to an embodiment, the display is formed in multi-surfaces, and even when the camera module is provided only at one surface of the electronic device, the electronic device may photograph while viewing a preview image through a display provided at one surface. Accordingly, because the electronic device according to an embodiment may not provide each of the cameras at every surface, components can be reduced, and by generally using a rear camera having a higher performance than that of a front camera used for self-photographing, a high quality of picture may be obtained.

When the electronic device detects a user selection (e.g., long press) to a content displayed in one of main areas and swipe to another main area, a content storing and sharing event according to various embodiments of the present invention may be detected. The electronic device may display a plurality of plates that can distinguish contents stored at another main area. Further, the electronic device may display an image (e.g., icon) corresponding to a plurality of plates in a sub-area connected and bent between the main areas. In an embodiment, when the electronic device detects swipe of an object (e.g., images, text, etc.) of a content selected in the main area to another main area via one image of a sub-area, the electronic device may display the selected object in a plate corresponding to an image of the touched sub-area and store data of the content corresponding to the object.

When contents are displayed in each of the first main area and the second main area, if a user selection of the screen conversion icon displayed on the first main area and the second main area is detected, a screen conversion event according to various embodiments of the present invention may be detected. When the user's holding position is detected, a display position of the screen conversion icon may be changed. When the screen conversion icon is detected, the electronic device may overlap and display a content displayed on the first main area and a content displayed on the second main area, receive a user selection of one of them, and display the selected content in the first main area. Here, the first main area may be a user viewing area determined according to the user's holding position.

With reference to FIG. 6, the electronic device may detect an event input at operation 601 and determine an input event at operation 602.

In an embodiment, the electronic device may determine that a function control event has been detected. For example, the electronic device may determine that a connection to an external electronic device has been detected.

The electronic device may perform a function corresponding to the event at operation 603. The electronic device may control the flexible display according to the performed function at operation 604.

In an embodiment, when the connected external electronic device is a Bluetooth speaker, the electronic device may display a user interface corresponding to a function of the Bluetooth speaker in a sub-area, for example, a first sub-area. The electronic device may detect a user input on the user interface displayed in the first sub-area and perform a corresponding function according to the user input. In an embodiment, when a user interface that lowers a volume is selected by the user, the electronic device may detect the user interface and control to reduce a volume of the speaker connected by Bluetooth.

Figure 7:
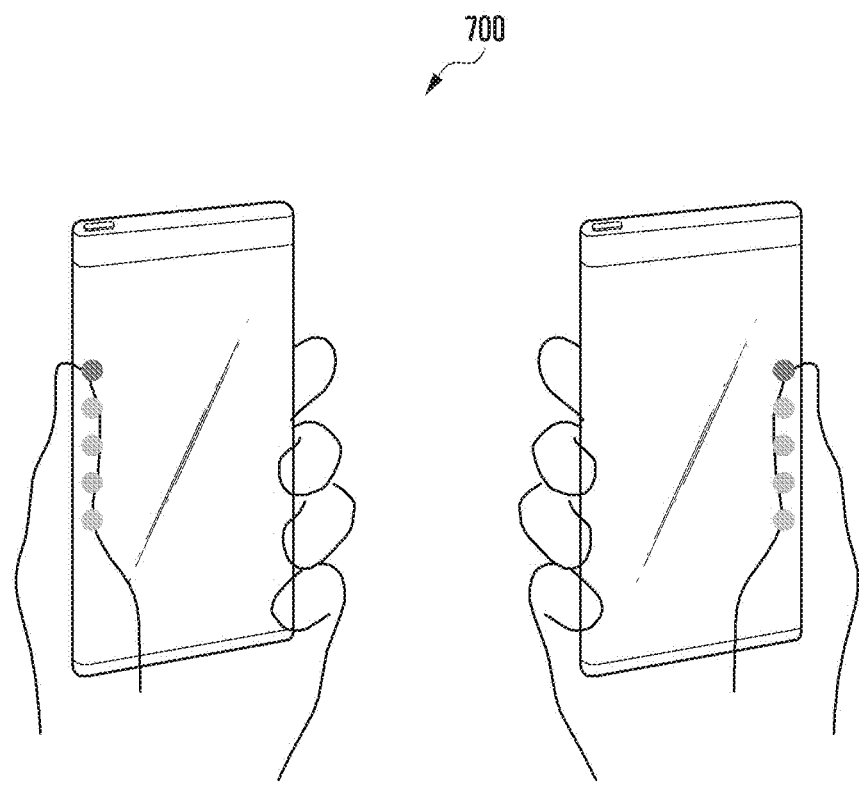
FIG. 7 is a diagram illustrating an electronic device having a flexible display according to various embodiments.

FIG. 7 is a diagram illustrating an operation using a flexible display in an electronic device according to various embodiments of the present invention.

With reference to FIG. 7, an electronic device 700 may detect the user's holding position. By detecting the user's holding position, the electronic device 700 may determine one area of a plurality of areas thereof to a first sub-area. When determining a first sub-area, a second sub-area, a first main area, and a second main area, the electronic device 700 may detect and determine the user's holding position.

Further, in the electronic device 700, the first sub-area may be fixed according to user setting. In an embodiment, in the electronic device 700, one of a left hand mode and a right hand mode may be set by the user. The first sub-area may be determined according to a preset mode.

According to various embodiments of the present invention, the electronic device may detect a holding position in the first sub-area and display the user interface in an area adjacent to a thumb.

Figure 8:
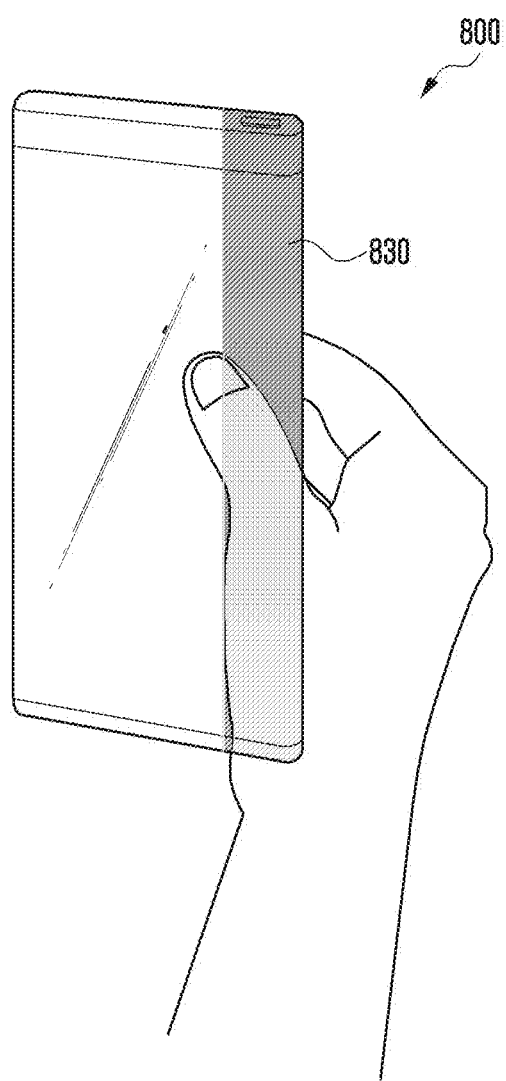
FIG. 8 is a diagram illustrating an electronic device having a flexible display according to various embodiments.

FIG. 8 is a diagram illustrating an operation using a flexible display in an electronic device according to various embodiments of the present invention.

With reference to FIG. 8, an electronic device 800 may extend an area in which a first sub-area 830 is displayed for user convenience. The electronic device 800 may detect a user's gesture in a direction of one area of main areas and extend and display the first sub-area 830 to some areas of the main areas in which detection is terminated.

Figure 9:
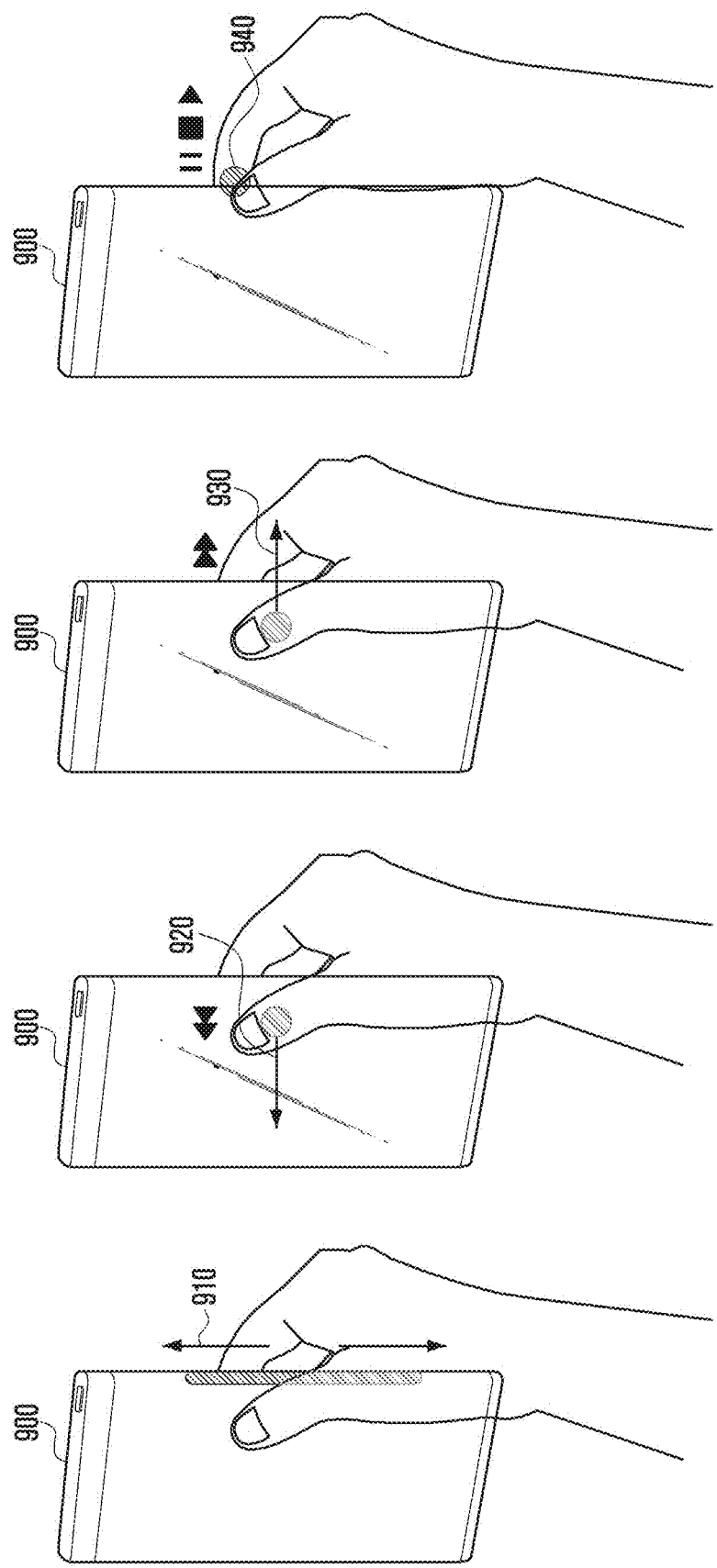
FIG. 9 is a diagram illustrating an electronic device having a flexible display according to various embodiments.

FIG. 9 is a diagram illustrating an operation using a flexible display in an electronic device according to various embodiments of the present invention.

With reference to FIG. 9, an electronic device 900 may detect an input event of the user and determine that the event is a function control event, i.e., detection of earphone connection.

The electronic device 900 may detect an earphone connection and display a user interface corresponding to a function related to the earphone in a sub-area, for example, the first sub-area. The electronic device 900 may detect a user input 910 on the user interface displayed in the first sub-area and perform a corresponding function according to the user input. Even if the user interface is not displayed in the first sub-area, when a user intuitive input is detected in the first sub-area, the electronic device 900 may perform a function corresponding thereto.

In an embodiment, when a user gesture that lowers a volume is detected in the first sub-area, the electronic device 900 may control to reduce a volume of a sound output to the earphone.

In another embodiment, when a user input 920 is detected on the user interface representing rewinding displayed in the first-sub area, the electronic device 900 may control to rewind reproducing music. In another embodiment, in order to rewind in the first sub-area, when a user input that drags in a left direction is detected, the electronic device 900 may control to rewind reproducing music.

In another embodiment, when a user input 930 is detected on a user interface representing quick winding displayed in the first sub-area, the electronic device 900 may control to rewind reproducing music. In another embodiment, when a user input that drags in a right direction is detected for quick winding in the first sub-area, the electronic device 900 may control to quickly wind reproducing music.

In another embodiment, when a user input 940 is detected on a user interface representing reproduction stop displayed in the first sub-area, the electronic device 900 may control to stop reproducing music. In another embodiment, for reproduction stop in the first sub-area, when a user input of tapping one time is detected, the electronic device 900 may control to stop reproducing music.

Although not shown, in another embodiment, when a user input (e.g., double tap) is detected on a user interface representing reproduction stop displayed in the first sub-area, the electronic device 900 may control to reproduce stop music. In another embodiment, when a user input of double tapping is detected in the first sub-area, the electronic device 900 may control to reproduce again stop music.

Figure 10:
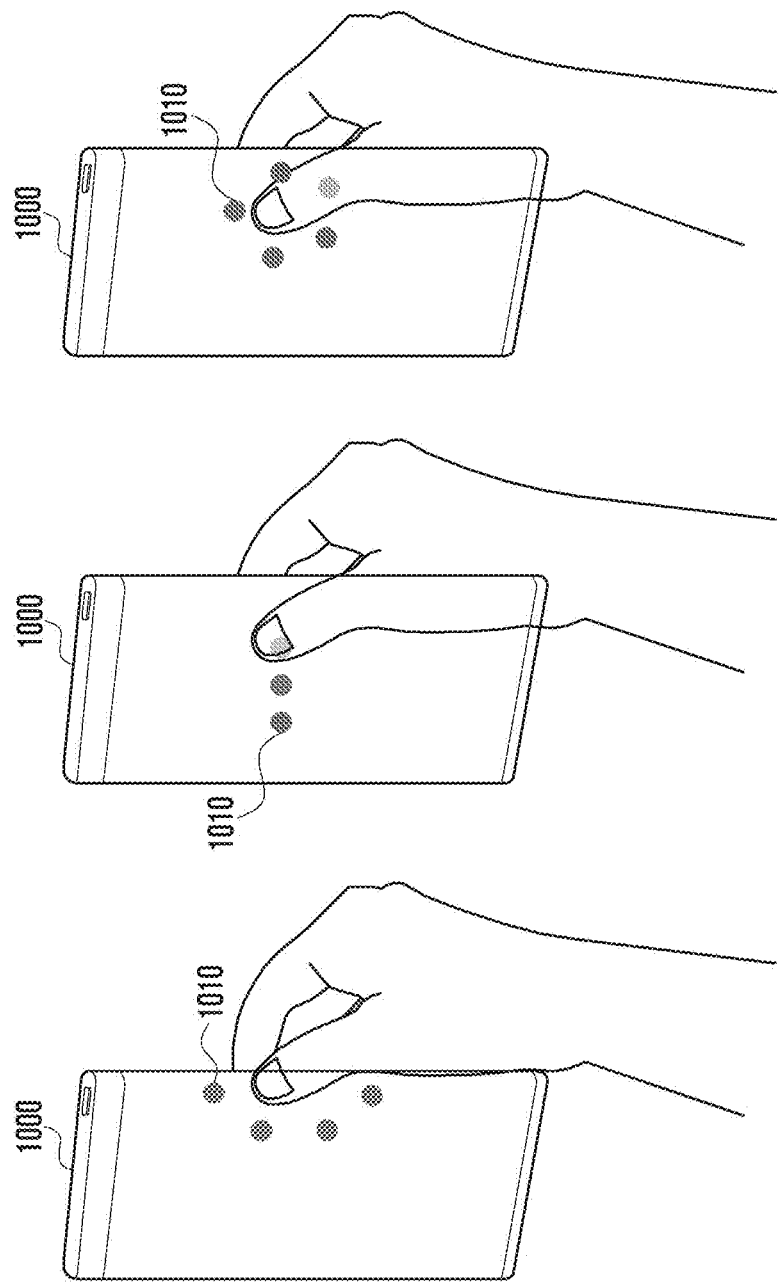
FIG. 10 is a diagram illustrating an electronic device having a flexible display according to various embodiments.

FIG. 10 is a diagram illustrating an operation using a flexible display in an electronic device according to various embodiments of the present invention.

With reference to FIG. 10, for an additional function corresponding to a content displayed on a main area, an electronic device 1000 may change and display a form of an execution icon 1010 corresponding to the additional function by extending the first sub-area according to a touch position on the main area of the user or according to a characteristic of the additional function.

According to various embodiments of the present invention, the electronic device 1000 may operate in a landscape mode or a portrait mode according to the connected or interworked external electronic device or function and change a position of an execution icon 1010 corresponding to an additional function in order to perform a both hand operation or a one hand operation.

Figure 11:
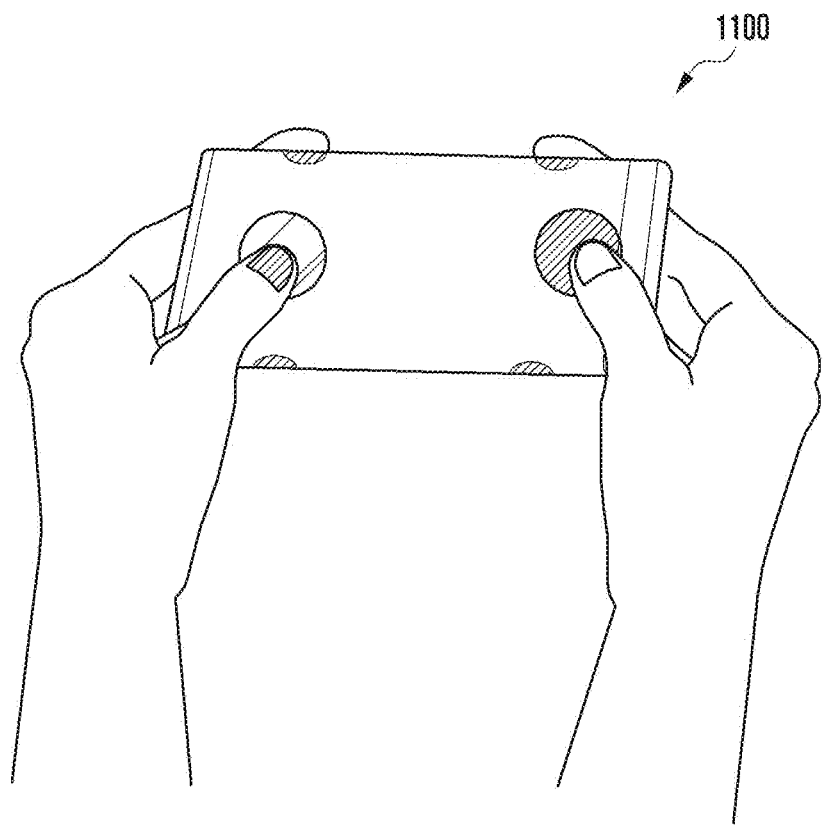
FIG. 11 is a diagram illustrating an electronic device having a flexible display according to various embodiments.

FIG. 11 is a diagram illustrating an operation using a flexible display in an electronic device according to various embodiments of the present invention.

With reference to FIG. 11, an electronic device 1100 may detect an event input of the user and determine that the event is a function control event, i.e., a user input for executing a specific service or application.

In an embodiment, when the electronic device 1100 recognizes execution of a car game application by the user, the electronic device 1100 may display a user interface that can perform a function related to a car game in a first sub-area. In an embodiment, the electronic device 1100 may display a user interface that can perform a function related to the car game in other areas as well as the first sub-area.

Figure 12A:
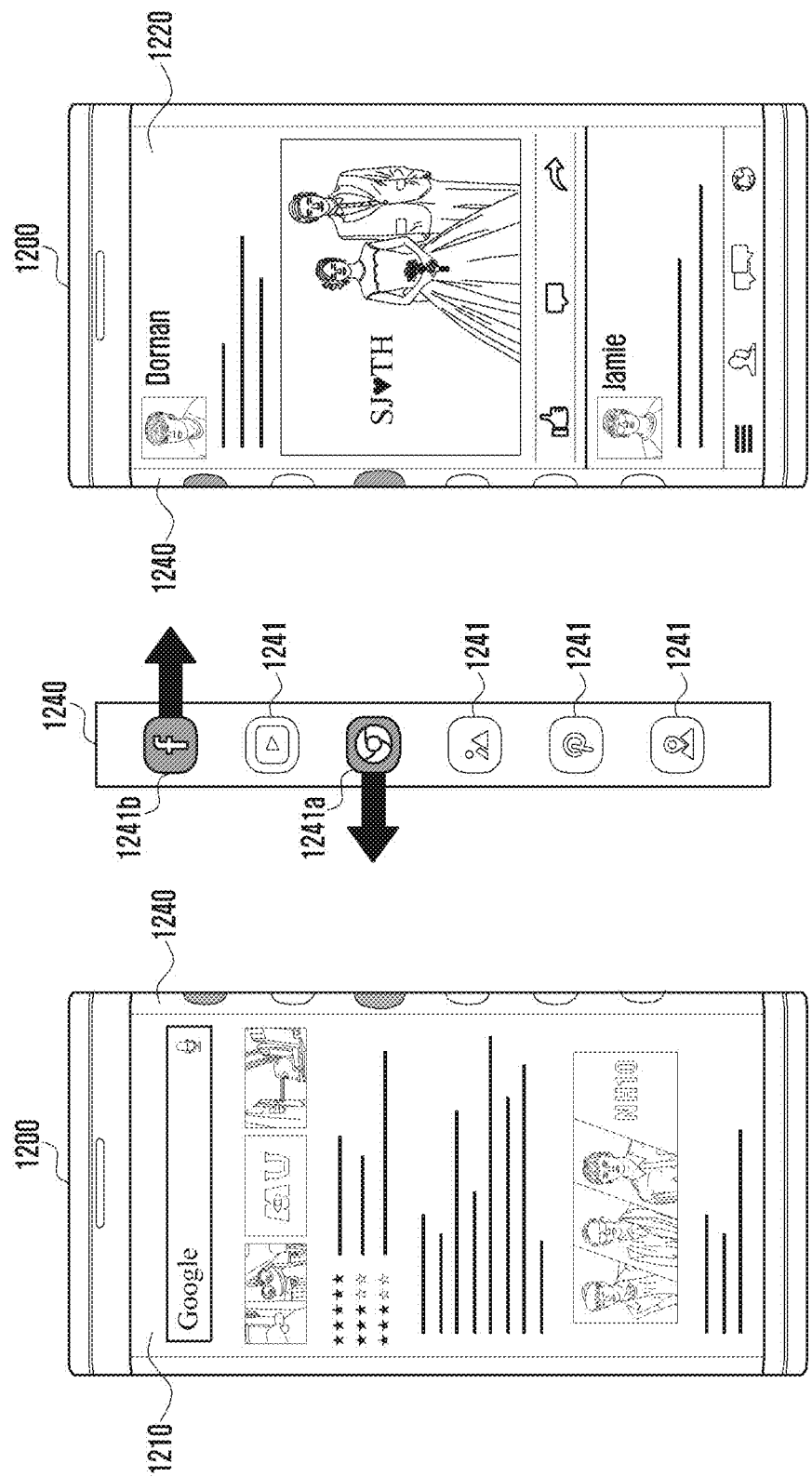
FIGS. 12A to 12B are diagrams illustrating an electronic device having a flexible display according to various embodiments.
Figure 12B:
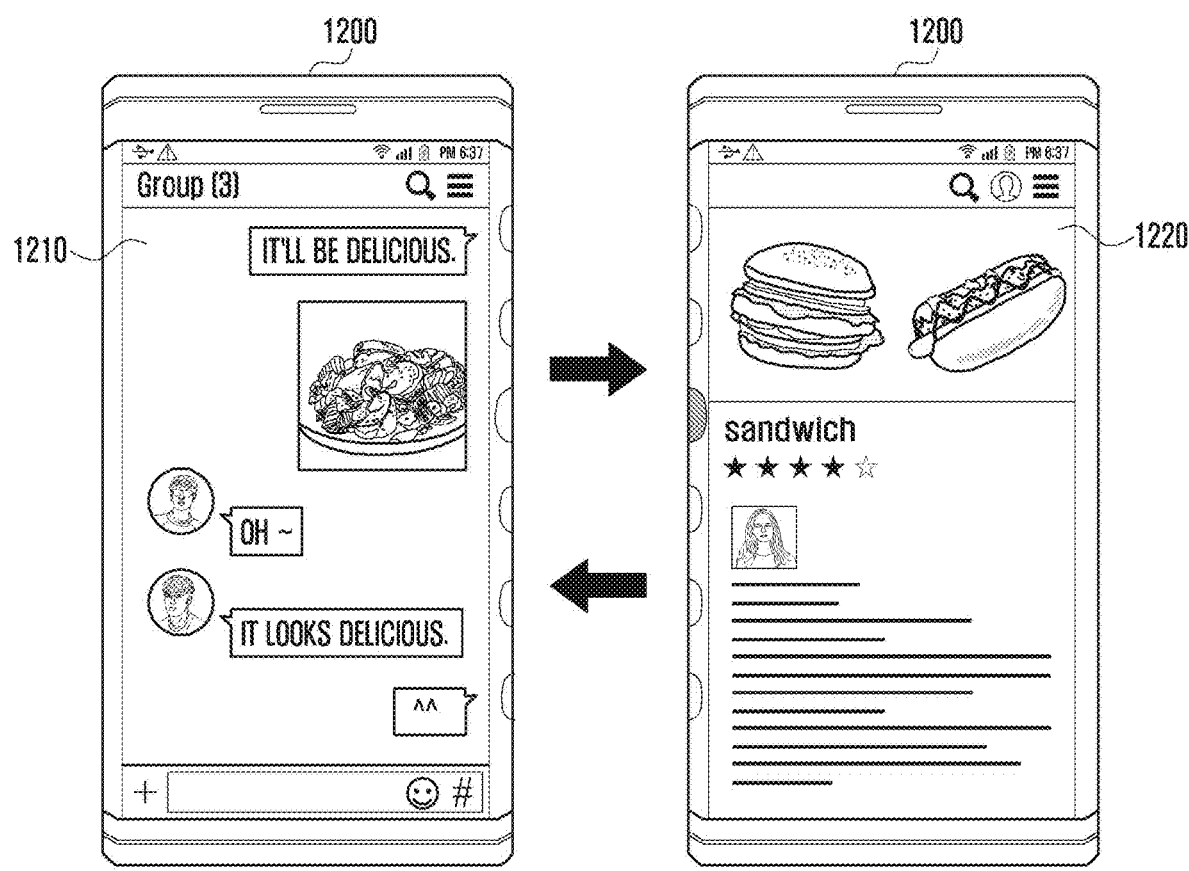

FIGS. 12A to 12B are diagrams illustrating an operation using a flexible display in an electronic device according to various embodiments of the present invention.

With reference to FIG. 12A, an electronic device 1200 may detect a content display event. According to an embodiment, when the electronic device 1200 detects a user touch input to at least one icon 1241a or 1241b of at least one icon 1241 displayed in a second sub-area 1240 and a swipe input to a first main area 1210 or a second main area 1220, the electronic device 1200 may detect a content display event. The electronic device 1200, having detected the user input may display a content of an application corresponding to the selected icon 1241a in the first main area 1210 or the second main area 1220 in which a user input is terminated.

According to an embodiment, the electronic device 1200 may detect a user selection of an icon 1241a corresponding to a web browser application and swipe to the first main area 1210. The electronic device 1200 may display a content of the web browser application on the first main area 1210. Thereby, the user may use a web browser on the first main area 1210.

Further, the electronic device 1200 may detect a user selection of an icon 1241b corresponding to an SNS application and swipe to the second main area 1220. While executing the SNS application, the electronic device 1200 may automatically attach a content displayed on the first main area 1210 to the SNS application. In another embodiment, the electronic device 1200 may display a content of the SNS application on the second main area 1220.

With reference to FIG. 12B, in the first main area 1210 of the electronic device 1200, a chat application may be executed and a related screen may be displayed. When the user wants to perform a search using a web browser without screen conversion while using a chat application displayed in the first main area 1210, the user may select an icon corresponding to the web browser application displayed in the second sub-area 1240 and swipe the icon to the second main area 1220 in which the chat application is not shown. The electronic device 1200, having detected this may display a content of a web browser application, which is an application corresponding to the icon displayed in the second sub-area 1240 in the second main area 1220. The user may execute and display the web browser application in the second main area 1220 with the foregoing simple manipulation while using a chat program in the first main area 1210.

According to an embodiment, the electronic device 1200 may detect a selection of an icon corresponding to the web browser application displayed in the second sub-area 1240 while displaying a screen related to a music reproduction application or a web page in the first main area 1210. When the user wants to search for music lyrics by using a web browser without screen conversion while using the music reproduction application displayed in the first main area 1210, the user may select an icon corresponding to a web browser application displayed in the second sub-area 1240 and swipe the icon to the second main area 1220 in which a chat application is not displayed. The electronic device 1200, having detected this may display a content of a web browser application, which is an application corresponding to the icon displayed in the second sub-area 1240 in the second main area 1220. By executing a web browser application activated in the second main area 1220 by turning backward the electronic device 1200 while using a music reproduction program in the first main area 1210, the user may search for a title related to music.

Figure 13:
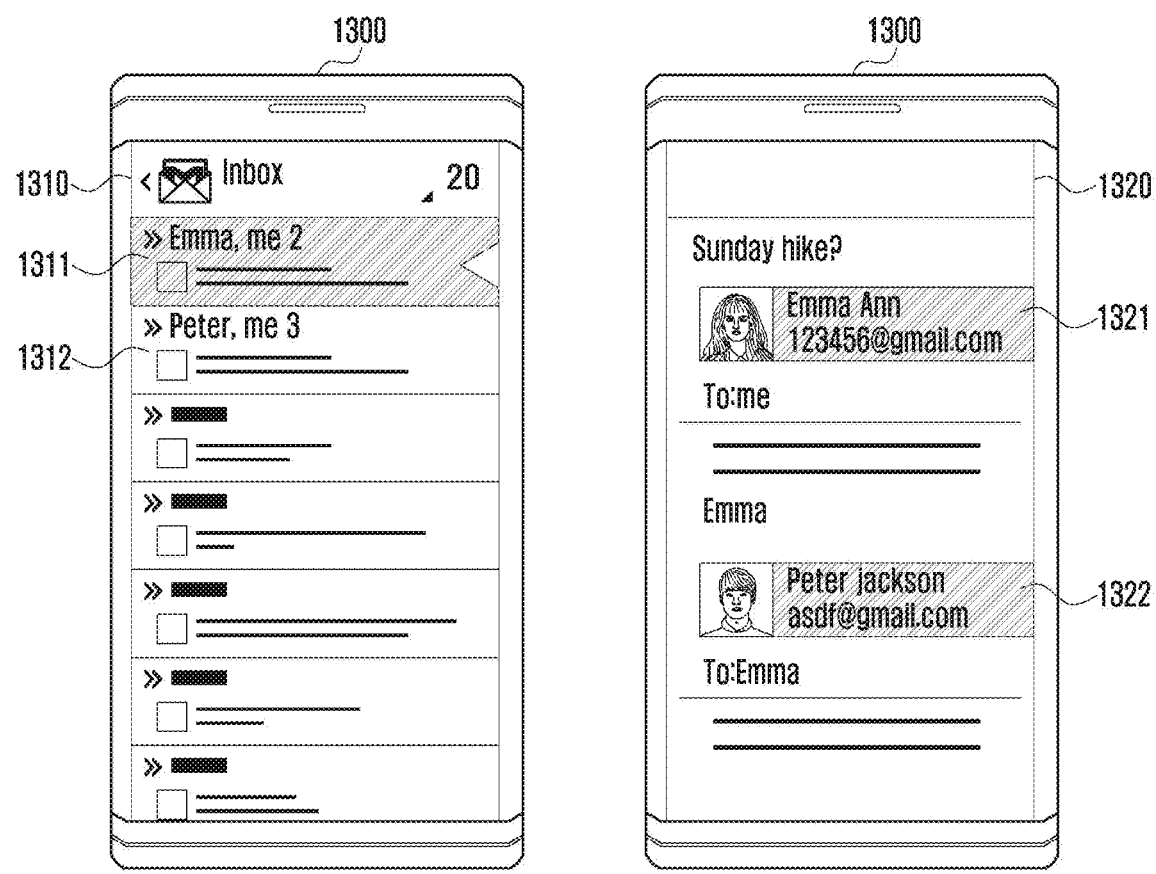
FIG. 13 is a diagram illustrating an electronic device having a flexible display according to various embodiments.

FIG. 13 is a diagram illustrating an operation using a flexible display in an electronic device according to various embodiments of the present invention.

With reference to FIG. 13, an electronic device 1300 may detect a content display event. When the electronic device 1300 detects a user selection on at least one content displayed on a main area and detects swipe to another main area (e.g., a second main area 1320) other than a main area (e.g., a first main area 1310) in which a content is displayed, the electronic device 1300 may detect a content display event. Thereby, additional information about the selected content may be displayed in another main area (e.g., the second main area 1320).

In an embodiment, the electronic device 1300 may detect a user selection on an e-mail list displayed on the first main area 1310. The electronic device 1300 may detect a user selection to at least one e-mail 1311 and 1312 of an e-mail list and a swipe input to the second main area 1320. Thereby, the electronic device 1300 may display additional information about the selected e-mails 1311 and 1312 in the second main area 1320. Additionally, when the electronic device 1300 simultaneously or sequentially detects the input to a plurality of e-mails 1311 and 1312 on the first main area 1310, the electronic device 1300 may simultaneously or sequentially display additional information about the plurality of e-mails 1321 and 1322 in the second main area 1320.

In an embodiment, the electronic device 1300 may detect a user selection onto an e-mail list displayed on the first main area 1310. The electronic device 1300 may detect a user selection to at least one e-mail 1311 and 1312 of an e-mail list and a swipe input to the second main area 1320. Thereby, the electronic device 1300 may display a writing window that can write a reply to the selected email in the second main area 1320. Additionally, when the electronic device 1300 simultaneously or sequentially detects the input to a plurality of e-mails 1311 and 1312 on the first main area 1310, the electronic device 1300 may simultaneously or sequentially display a writing window that can write a reply to the plurality of e-mails in the second main area 1320. The user may immediately write a reply e-mail in the second main area 1320 by turning the electronic device 1300 backward.

Figure 14:
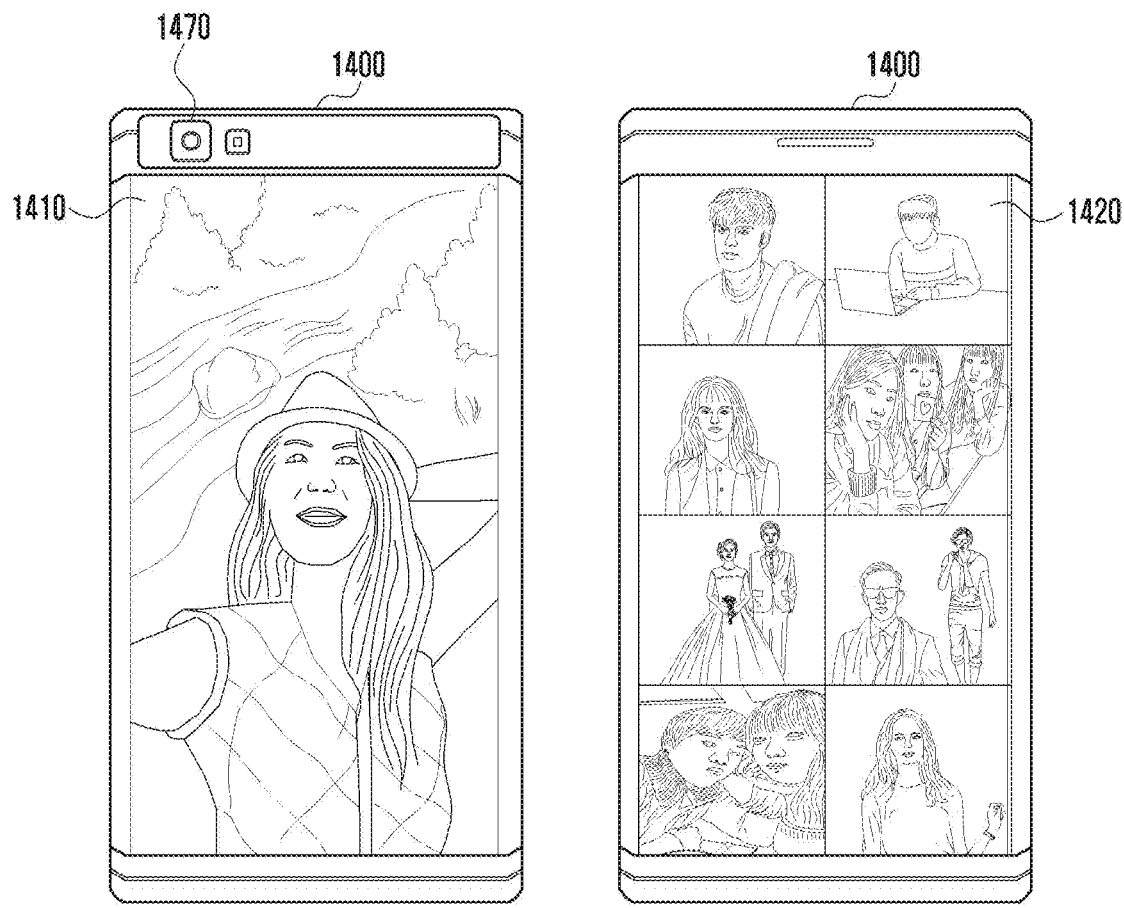
FIG. 14 is a diagram illustrating an electronic device having a flexible display according to various embodiments.

FIG. 14 is a diagram illustrating an operation using a flexible display in an electronic device according to various embodiments of the present invention.

With reference to FIG. 14, in an electronic device 1400, a camera 1470 may be executed by the user. Accordingly, the electronic device 1400 may detect a content display event and display a preview image or a photographed image in one main area (e.g., a first main area 1410). The electronic device 1400 may display a gallery in which a photographed image is stored in another main area (e.g., a second main area 1420) or an image related to the photographed image.

Figure 15:
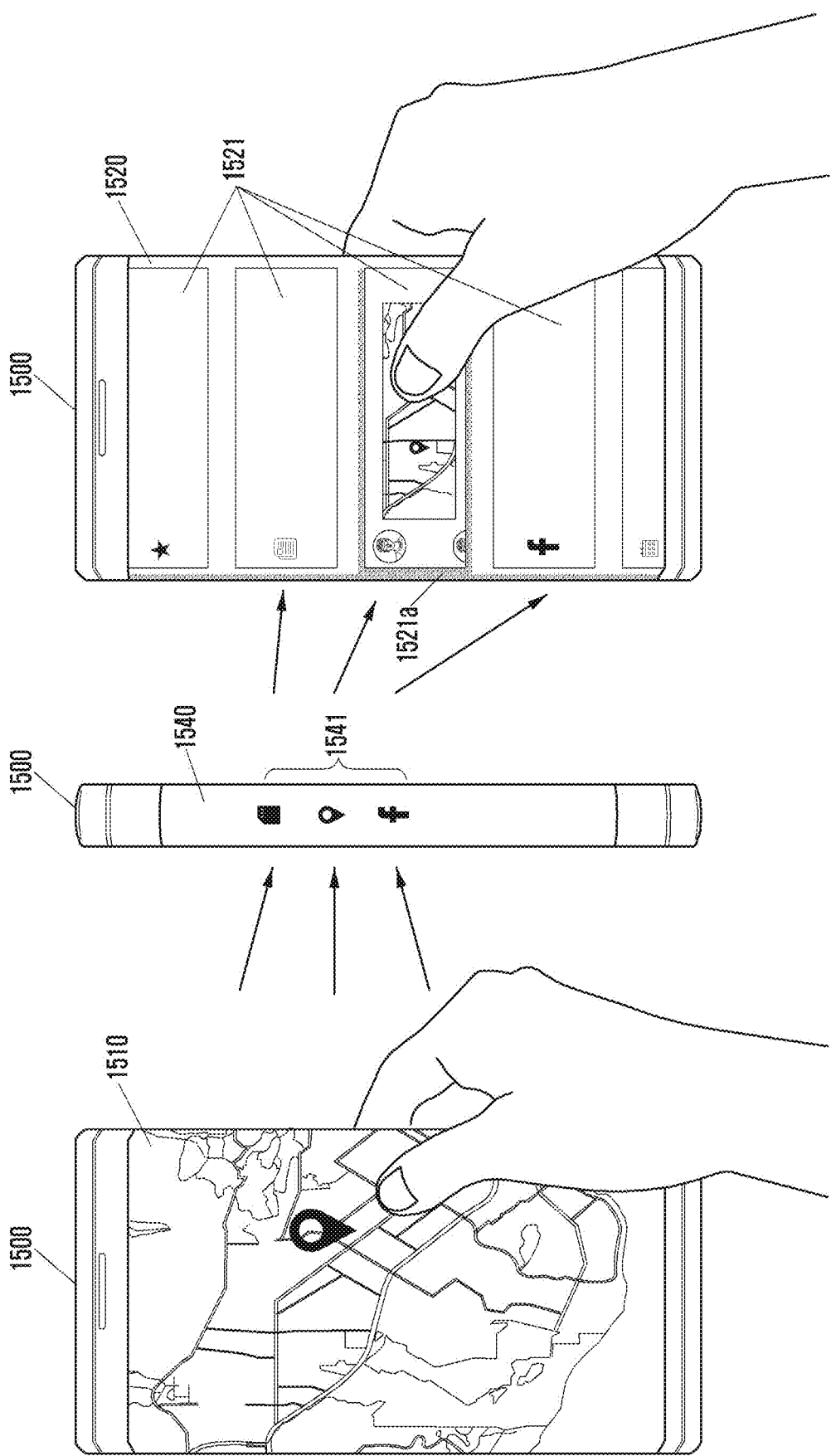
FIG. 15 is a diagram illustrating an electronic device having a flexible display according to various embodiments.

FIG. 15 is a diagram illustrating an operation using a flexible display in an electronic device according to various embodiments of the present invention.

With reference to FIG. 15, when an electronic device 1500 detects a user selection (e.g., long press) to a content displayed in one of main areas and swipe to another main area, the electronic device 1500 may detect a content storing and sharing event.

The electronic device 1500 may execute a clip art function in another main area. When the clip art function is executed, the electronic device 1500 may display a plurality of plates that can distinguish contents stored at another main area. Further, the electronic device 1500 may display an image (e.g., an icon) corresponding to the plurality of plates in a sub-area connected and bent between the main areas.

When the electronic device 1500 detects swipe of an object (e.g., image, text) of a selected content in the main area to another main area through an image of one of sub-areas, the electronic device 1500 may display the selected object in a plate corresponding to an image of the touched sub-area and store data of the content corresponding to the object at a storage area related to the image.

In an embodiment, the electronic device 1500 may execute a map application in a first main area 1510 to display a content corresponding thereto. The electronic device 1500 may detect a user selection onto the content and a swipe input to a second main area 1520. For example, the electronic device 1500 may detect a long press input or a double tap input of the user on the content and a swipe input to the second main area 1520.

In another embodiment, when the electronic device 1500 detects a user selection (e.g., long press) to a content displayed in one of main areas and swipe to another main area, a content storing and sharing event may be detected. The electronic device 1500 may display a plurality of plates 1521 that can distinguish contents stored at another main area (e.g., the second main area 1520). Further, the electronic device 1500 may display an image (e.g., an icon) corresponding to a plurality of plates in the sub-area connected and bent between the main areas. In an embodiment, when the electronic device 1500 detects swipe of an object (e.g., image, text) of a content selected in the main area to another main area (e.g., a second main area 1520) via one image 1541 of a second sub-area 1540, the electronic device 1500 may display the selected object in a plate corresponding to an image of the touched second sub-area 1540 and store data of the content corresponding to the object at a storage area (e.g., the memory 130) related to the image.

The electronic device 1500 may give an effect 1521a in order to enable the user to determine that the plate has been selected while displaying the selected object in a plate corresponding to an image of the touched second sub-area 1540 on the second main area 1520. Further, when the electronic device 1500 detects a touch of an image of one of the second sub-areas 1541, the electronic device 1500 may give an effect even to the second sub-area 1541 to enable the user to determine.

According to various embodiments of the present invention, when the electronic device 1500 detects a user selection (e.g., long press) to a content displayed in one of main areas and swipe to a sub-area, the electronic device 1500 may detect a content storing and sharing event.

By executing a clip art function on the second main area 1520, the electronic device 1500 may display an image (e.g., an icon) that is not displayed, but corresponding to a plate displayed upon executing the clip art in one of sub-areas connected and bent between the main areas. For example, the area may be a second sub-area 1540.

The electronic device 1500 may detect a user input that swipes and releases a selected content in at least one of images corresponding to the plate displayed in the second sub-area 1540. The electronic device 1500 may detect a user input to store data corresponding to the content at a storage area (e.g., the memory 130) related to a released image, even if the electronic device 1500 does not display an object corresponding to a content in the second sub-area 1540.

Figure 16:
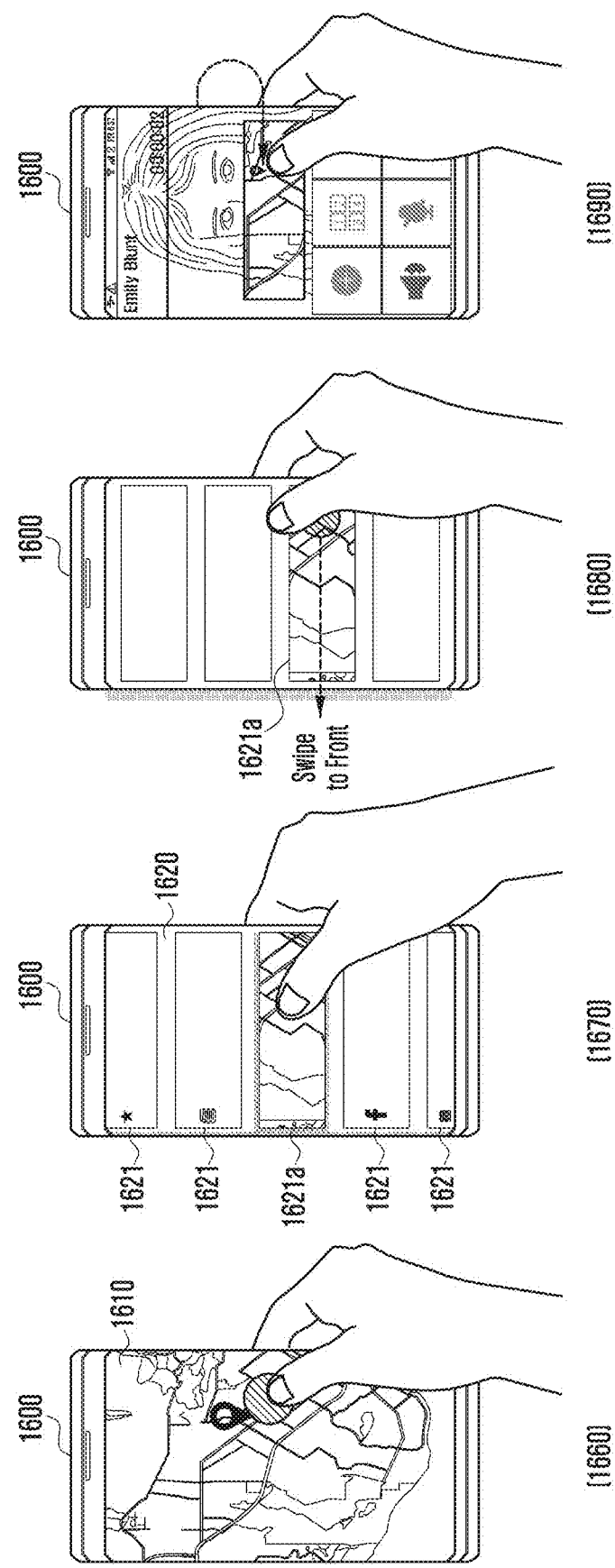
FIG. 16 is a diagram illustrating an electronic device having a flexible display according to various embodiments.

FIG. 16 is a diagram illustrating an operation using a flexible display in an electronic device according to various embodiments of the present invention.

With reference to reference number 1660 of FIG. 16, when an electronic device 1600 detects a user selection (e.g., long press) to a content of a map application, which is a content displayed in a first main area 1610 and swipe to a second main area 1620, the electronic device 1600 may detect a content storing and sharing event.

With reference to reference number 1670, the electronic device 1600 displays a plurality of plates 1621 in the second main area 1620, and when the electronic device 1600 detects that an object (e.g., images, text) of the selected content is swiped to the second main area 1620, the electronic device 1600 may display the selected object in at least one plate 1621a of a plurality of plates and store data of a content corresponding to the object. The electronic device 1600 may display the effect in a selected plate 1621a among a plurality of plates 1621 displayed in the second main area 1620.

Thereafter, the user may share a content stored at the electronic device 1600 while performing another function. With reference to reference numerals 1680 and 1690, while communicating with another party (e.g., phone call), the electronic device 1600 may display a communication screen in the first main area 1610. In an embodiment, the electronic device 1600 may execute and display a clip art function in the second main area 1620. In another embodiment, when a function related to communication is executed and displayed in the first main area 1610, the electronic device 1600 may execute and display a clip art function in the second main area 1620.

With reference to reference numeral 1680, the electronic device 1600 may detect a user input that selects an object displayed in at least one plate 1621a of a plurality of plates of a clip art. The electronic device 1600 may detect a user selection of the object and a swipe input to the first main area 1610. The electronic device 1600 may detect the user input and display a notification notifying that an object is selected in a sub-area in which swipe is detected, for example, a second sub-area 1640 and is shared in a first main area 1610. For example, the notification may include lightening and a color change.

With reference to reference numeral 1690, the electronic device 1600 may overlap and display one object selected by the user on the first main area 1610 that displays a screen that performs another function, for example, communication with another party. In an embodiment, when a swipe input of the user is released, the electronic device 1600 may share data of a content corresponding to the object with another party.

Figure 17:
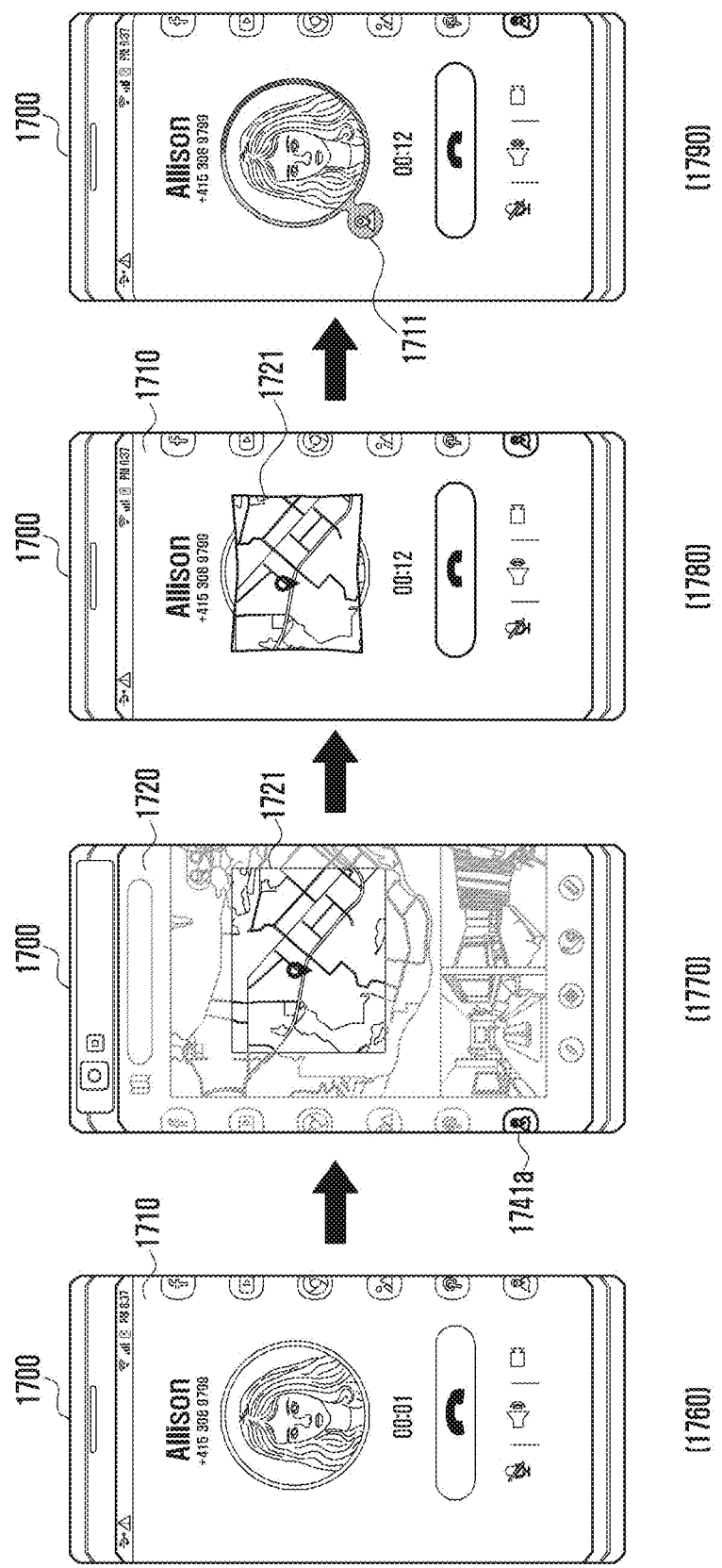
FIG. 17 is a diagram illustrating an electronic device having a flexible display according to various embodiments.

FIG. 17 is a diagram illustrating an operation using a flexible display in an electronic device according to various embodiments of the present invention.

With reference to reference numeral 1760, when an electronic device 1700 is communicating with another party (e.g., phone call), the electronic device 1700 may display a communication screen in a first main area 1710. The electronic device 1700 may display icons corresponding to a plurality of functions or applications displayed in a second sub-area 1740. The electronic device 1700 may detect a user input that selects at least one 1741a of icons and a swipe input to a second main area 1720. The electronic device 1700 may execute and display a function or an application corresponding to the selected icon 1741a in the second main area 1720 while maintaining a communication screen display in a first main area 1710.

With reference to reference numeral 1770, the electronic device 1700 may detect a user selection of the icon 1741a corresponding to a map application among icons of the second sub-area 1740 and a swipe input to the second main area 1720, execute the application in the second main area 1720, and display a screen corresponding thereto. The electronic device 1700 may detect a user input for selecting one of contents related to the map application displayed on the second main area 1720. In an embodiment, the input for selecting a content may include a long press or a double tap input. The content may be captured and an object 1721 corresponding to the content may be generated through the long press or the double tap input.

With reference to reference numeral 1780, the electronic device 1700 may detect a swipe input of an object 1721 corresponding to a content selected by the user to the first main area 1710 in which a communication screen is displayed. The electronic device 1700 may move an object 1721 corresponding to a content selected by the user onto the first main area 1710 to overlap and display the object 1721 on a communication screen displayed on the first main area 1710. When a swipe input of the user is released or when a swipe input of the user arrives on the first main area 1710, the electronic device 1700 may transmit data of the content corresponding to the object 1721 to communicating another party. The content data may include an image of the content selected by the user, a web page in which the content is displayed, or a link address that can execute an application.

With reference to reference numeral 1790, when transmission of data transmitted by the user is complete or when another party receives reception completion information of the data through a network, the electronic device 1700 may display a notification on the first main area 1710 that displays a communication screen. The notification may include a notification such as display of a random image at a periphery of a profile picture and a phone number of another party in the communication screen displayed on the first main area 1710. In an embodiment, because transmission data are data related to a map, a map related icon 1711 may be displayed at a periphery of a profile picture and a phone number of another party.

Figure 18:
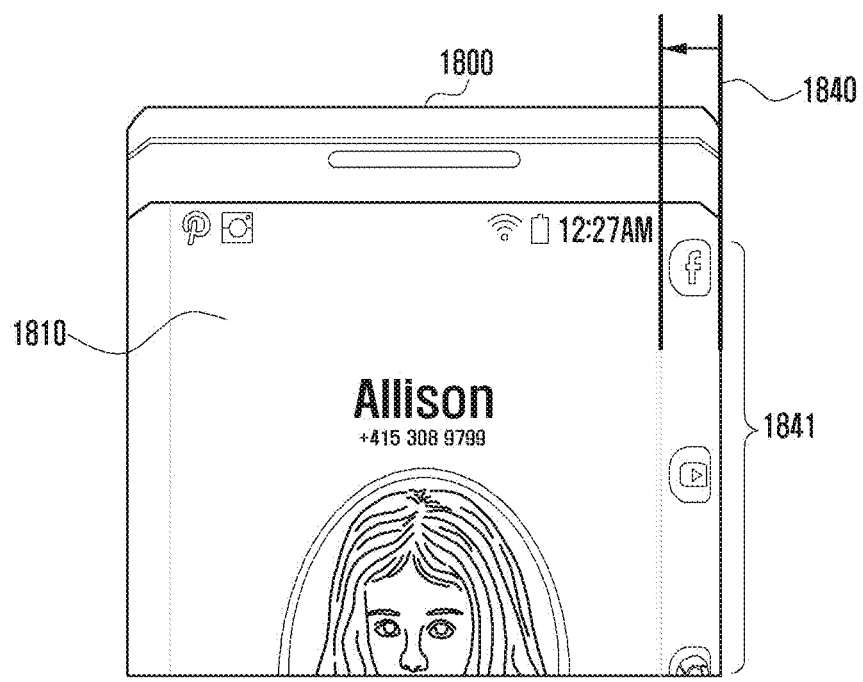
FIG. 18 is a diagram illustrating an electronic device having a flexible display according to various embodiments.

FIG. 18 is a diagram illustrating an operation using a flexible display in an electronic device according to various embodiments of the present invention.

With reference to FIG. 18, an electronic device 1800 may divide and control a flexible display into a first main area 1810 and a second main area, which are main areas of a front surface and a rear surface thereof and a first sub-area and a second sub-area 1840, which are sub-areas of a side surface thereof. In the second sub-area 1840, a plurality of images (e.g., icon 1841) corresponding to the plurality of applications or functions may be displayed.

In an embodiment, the electronic device 1800 may detect a user selection input on the second sub-area 1840 and a swipe input to an area, for example, the first main area 1810 in which a user views the electronic device 1800. Whether the user views which area of the first main area 1810 and the second main area of the electronic device 1800 may be determined based on the user's holding position. Further, whether the user views which area of the first main area 1810 and the second main area of the electronic device 1800 may be determined by determining whether which mode of a preset left hand mode and right hand mode is activated.

The electronic device 1800, having detected a user input may extend and move a size and position of an icon 1841 displayed in the second sub-area 1840 to an area in which the user's swipe input is released. In an embodiment, when the electronic device 1800 detects that the user uses the second main area thereof, the second sub-area 1840 extended and displayed to the first main area 1810 may be extended and displayed to the second main area in an opposite direction.

Figure 19:
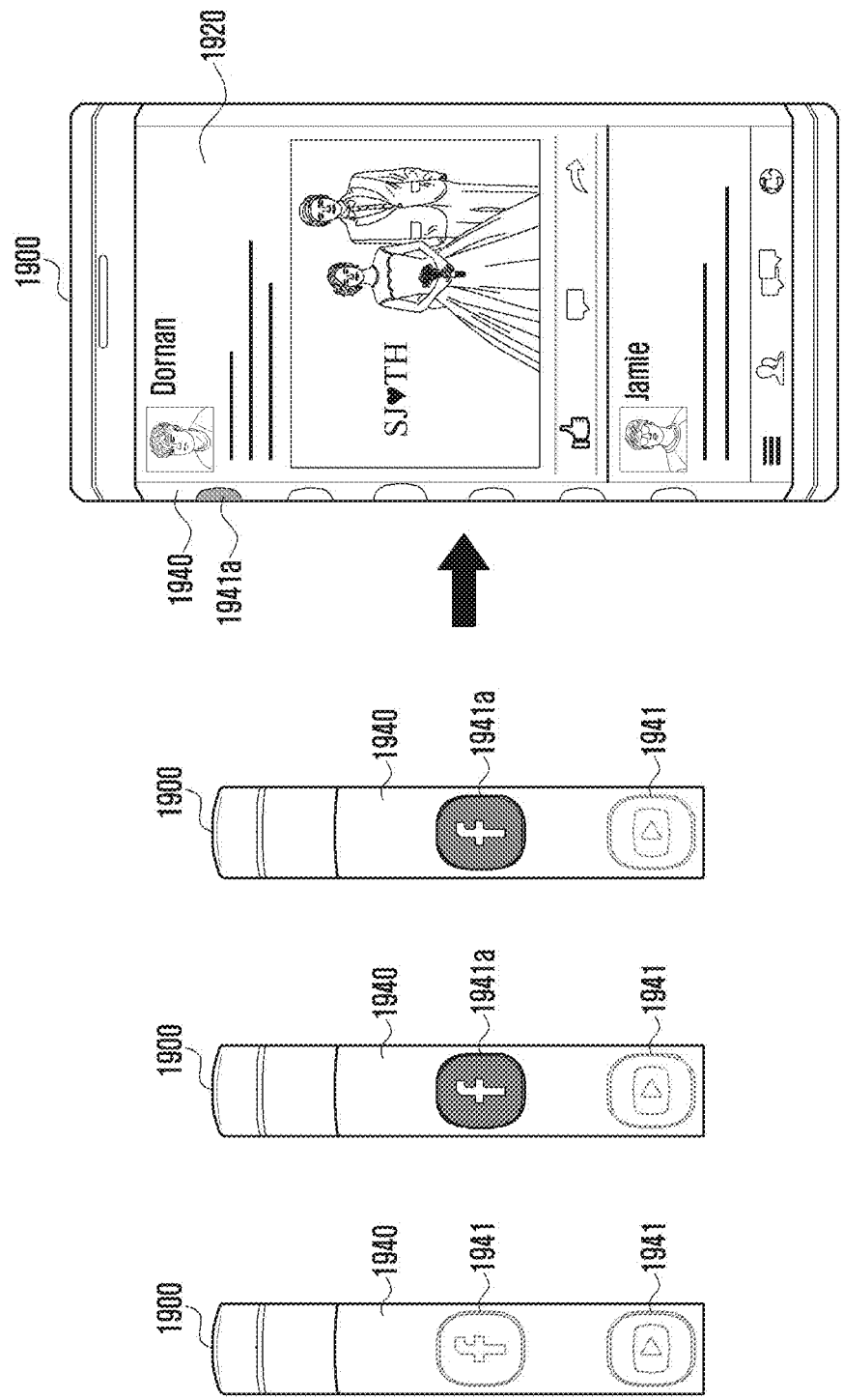
FIG. 19 is a diagram illustrating an electronic device having a flexible display according to various embodiments.

FIG. 19 is a diagram illustrating an operation using a flexible display in an electronic device according to various embodiments of the present invention.

With reference to FIG. 19, in a second sub-area 1940 of an electronic device 1900, a plurality of images (e.g., icons 1941) corresponding to a plurality of applications or functions may be displayed. The electronic device 1900 may display a plurality of icons 1941 with transparent, black and white, etc., in the second sub-area 1940. When the electronic device 1900 detects an input such as a user's selection input and a swipe input, the electronic device 1900 may change and display a color of a selected icon 1941*a* among the icons 1941 displayed with transparent or black and white in order to represent user selection and activation.

In an embodiment, the electronic device 1900 may detect an input that selects one icon 1941*a* (e.g., SNS application) of a plurality of icons 1941 displayed with transparent and black and white in the second sub-area 1940 and a swipe input to a second main area 1920. The electronic device 1900 may detect the user input to execute an application (e.g., SNS application) corresponding to the icon 1941*a* in the second main area 1920 and display a screen related to the application.

Figure 20:
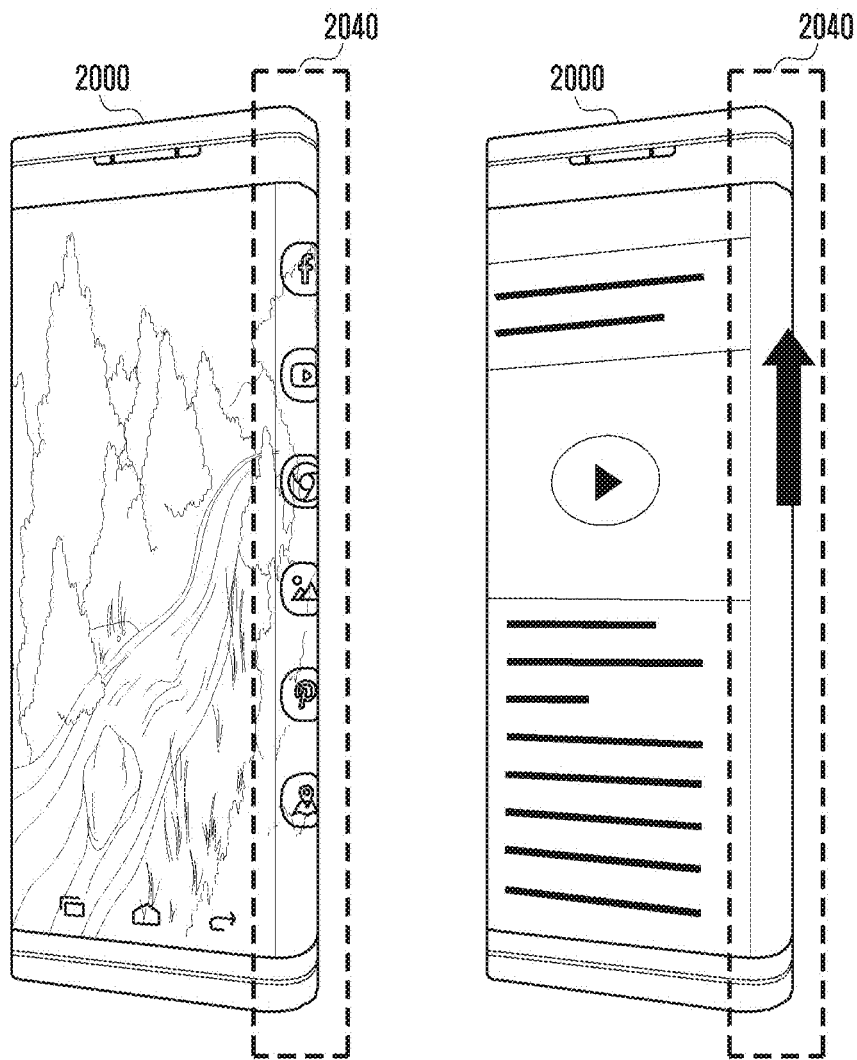
FIG. 20 is a diagram illustrating an electronic device having a flexible display according to various embodiments.

FIG. 20 is a diagram illustrating an operation using a flexible display in an electronic device according to various embodiments of the present invention.

With reference to FIG. 20, in a second sub-area 2040 of an electronic device 2000, a plurality of images (e.g., icons) corresponding to a plurality of applications or functions may be displayed. The electronic device 2000 may detect a swipe input of the user in a direction from downward to upward on the second sub-area 2040. When the electronic device 2000 detects a user input, the electronic device 2000 may control a plurality of images displayed on the second sub-area 2040 to disappear.

According to various embodiments of the present invention, when the electronic device 2000 detects a user input, the electronic device 2000 may enable a plurality of images displayed on the second sub-area 2040 to disappear and extend and display a content displayed on the first main area or the second main area to the second sub-area 2040.

According to various embodiments of the present invention, an input detected on the second sub-area 2040 to enable a plurality of images to disappear is not limited to a swipe input from downward to upward. When the electronic device 2000 detects a gesture (e.g., a double tap) set by the user on the second sub-area 2040, the electronic device 2000 may control the second sub-area 2040 to control a plurality of images to disappear.

According to various embodiments of the present invention, when a user input is detected in a plurality of images displayed in the second sub-area 2040 for a predetermined time, a display of the second sub-area 2040 may be terminated.

According to various embodiments of the present invention, the electronic device 2000 may detect that the user does not carry or view the electronic device 2000 through a motion sensor or an iris sensor thereof to control a plurality of images displayed in the second sub-area 2040 to disappear.

According to various embodiments of the present invention, when the electronic device 2000 detects a user input (e.g., a rubbing input, a tap input, drag from the top to the bottom, and drag from the bottom to the top) on a second sub-area 2040 in which a plurality of images are disappeared, the electronic device 2000 may display again a plurality of disappeared icons.

FIGS. 21A to 21F are diagrams illustrating an operation using a flexible display in an electronic device according to various embodiments of the present invention.

Figure 21A:
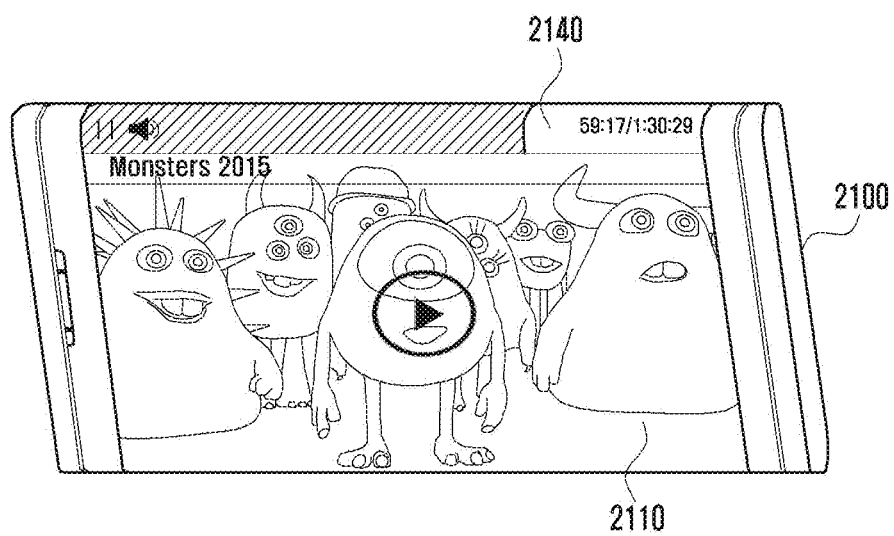
FIGS. 21A to 21D are diagrams illustrating an electronic device having a flexible display according to various embodiments.

With reference to FIG. 21A, an electronic device 2100 may display a moving picture screen in one area (e.g., a first main area 2110) of the first main area 2110 and a second main area 2120. The electronic device 2100 may display a reproduction bar representing a reproduction level of a moving picture screen displayed in at least one area (e.g., a second sub-area 2140) of a first sub-area 2130 and the second sub-area 2140 connected to an area in which the moving picture screen is displayed.

In an embodiment, when a moving picture reproduction screen is displayed in the first main area 2110, the electronic device 2100 the electronic device 2100 may detect a user input to a reproduction bar displayed on the second sub-area 2140. The electronic device 2100 may control moving picture reproduction to a time corresponding to a user touch location on the reproduction bar.

According to various embodiments of the present invention, the electronic device 2100 may display a process of downloading a moving picture or a file in one area (e.g., the first main area 2110) of the first main area 2110 and the second main area 2120. The electronic device 2100 may display a progress bar representing a download level displayed in at least one area (e.g., the second sub-area 2140)

of the first sub-area 2130 and the second sub-area 2140 connected to an area in which the process is displayed.

Figure 21B:
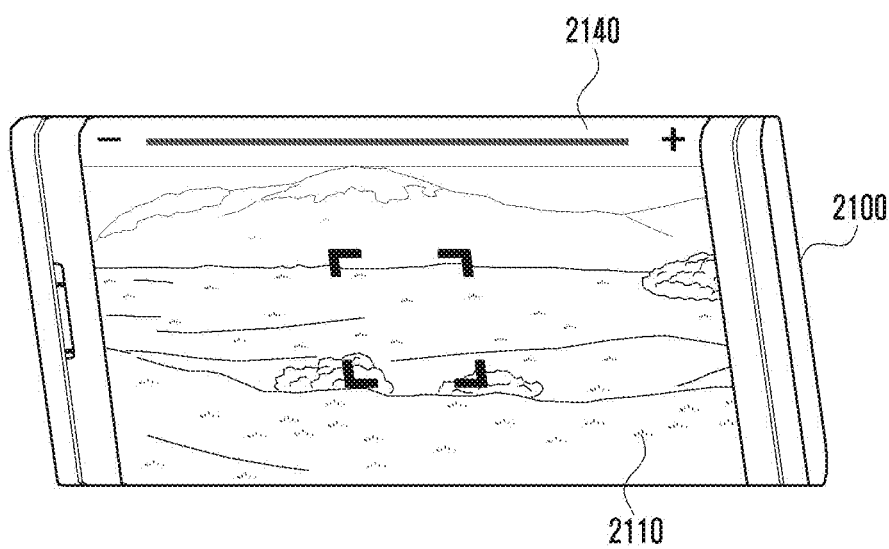

With reference to FIG. 21B, the electronic device 2100 may display a preview image corresponding to camera execution in one area (e.g., the first main area 2110) of the first main area 2110 and the second main area 2120. The electronic device 2100 may display a zoom bar that can control zoom-in or zoom-out of a preview image in at least one area (e.g., the second sub-area 2140) of the first sub-area 2130 and the second sub-area 2140 connected to an area in which a preview image is displayed.

Figure 21C:
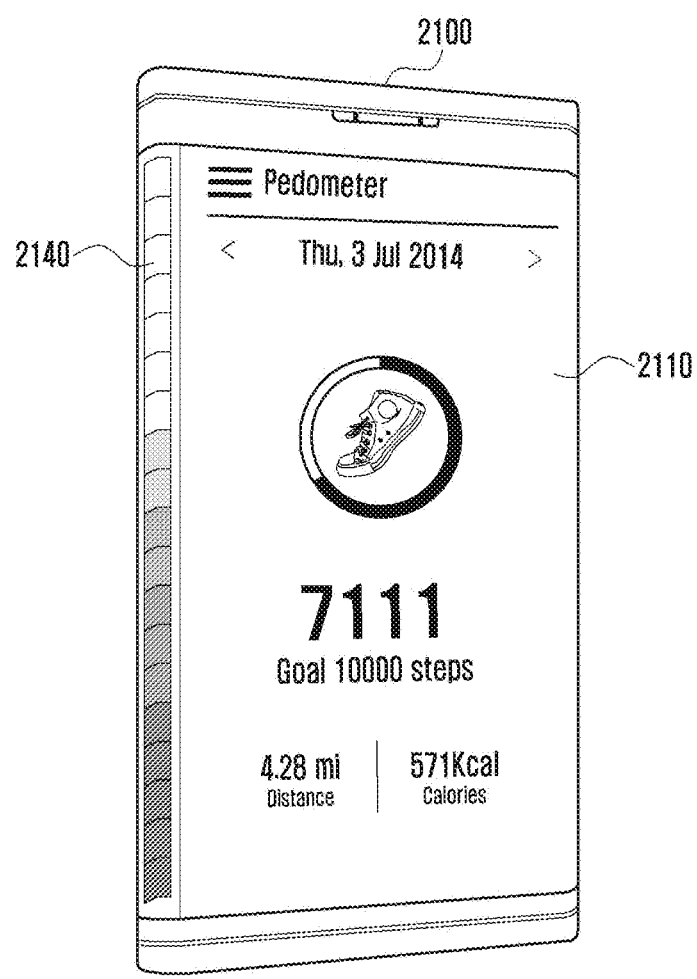

With reference to FIG. 21C, the electronic device 2100 may display a health related application in one area (e.g., a first main area 2110) of the first main area 2110 and the second main area 2120. The electronic device 2100 may display a state bar related to a health related application in at least one area (e.g., the second sub-area 2140) of the first sub-area 2130 and the second sub-area 2140 connected to an area in which the health related application is displayed.

In an embodiment, the electronic device 2100 may display a pedometer application as a health related application in the first main area 2110. The electronic device 2100 may display an image, for example, a bar graph representing the number of steps in at least one area (e.g., the second sub-area 2140) of the first sub-area 2130 and the second sub-area 2140 connected to an area in which the pedometer application is displayed. In an embodiment, the electronic device 2100 may display a heart rate received from the electronic device 2100 or an external electronic devices 2100 interworked with the electronic device 2100, and a moving path and moving speed of the electronic device 2100 on the second sub-area 2140.

Figure 21D:
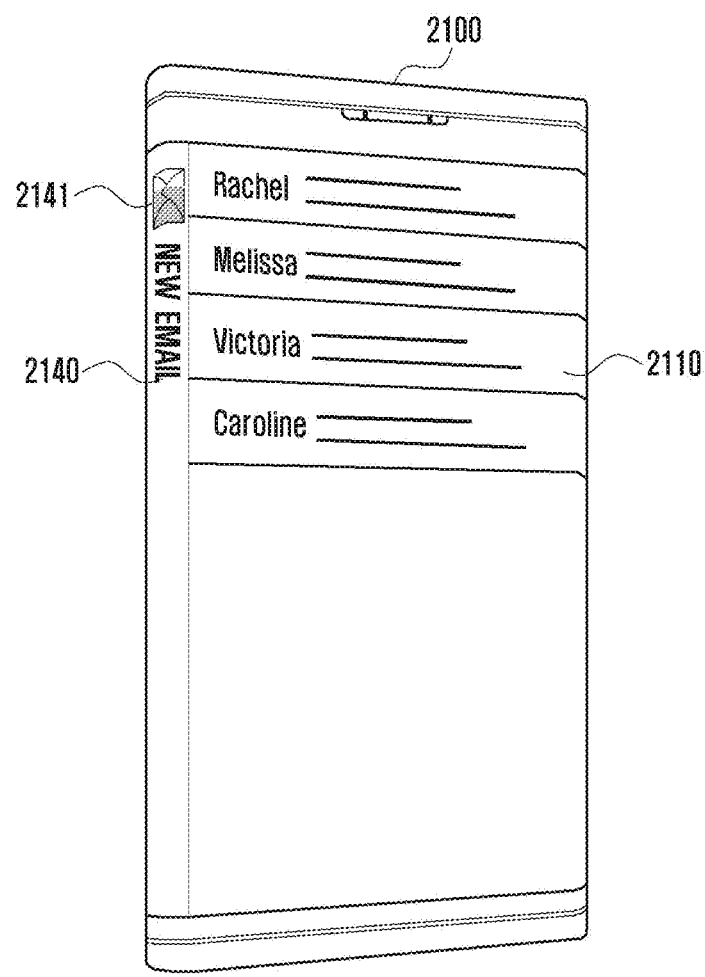

With reference to FIG. 21D, the electronic device 2100 may display an image (e.g., icon) related to an application or a function in one sub-area (e.g., the second sub-area 2140) of sub-areas connected to at least one area of the first main area 2110 and the second main area 2120. In an embodiment, the electronic device 2100 may display an icon 2141 related to a mail application in the second sub-area 2140, and when a user selection is detected, the electronic device 2100 may display a screen related to a mail application corresponding to the icon 2141 in at least one area (e.g., the first main area 2110) of the first main area 2110 and the second main area 2120. When the electronic device 2100 detects a user selection of the icon 2141 of the email-related application displayed in the second sub-area 2140, the electronic device 2100 may change and display a color in order to mean activation. In an embodiment, the electronic device 2100 may change and display a color of only a partial area of the icon 2141 to correspond to a ratio of unread emails to the entire emails of an email related application displayed in the second sub-area 2140.

With reference to FIG. 21E, the electronic device 2100 may display an image (e.g., an icon 2142) related to an application or a function in one sub-area (e.g., the second sub-area 2140) of sub-areas connected to at least one area of the first main area 2110 and the second main area 2120. In an embodiment, the electronic device 2100 may display an icon 2142 related to a communication application in the second sub-area 2140, and when the electronic device 2100 detects a user selection, the electronic device 2100 may display a communication application corresponding to the icon 2142 on a screen related to at least one area (e.g., the first main area 2110) of the first main area 2110 and the second main area 2120. When the electronic device 2100 detects a user selection of the icon 2142 of the communication related application displayed in the second sub-area 2140, the electronic device 2100 may change and display a color thereof in order to mean activation. In an embodiment, the electronic device 2100 may change and display only a color of a partial area of the icon 2141 to correspond to a ratio of calls received during absence of a user to the entire reception and transmission of a communication related application displayed in the second sub-area 2140.

With reference to FIG. 21F, the electronic device 2100 may display an image (e.g., an icon 2143) related to an application or a function in one sub-area (e.g., the second sub-area 2140) of sub-areas connected to at least one area of a first main area 2110 and a second main area 2120. In an embodiment, the electronic device 2100 may display an icon 2143 related to a bookmark or clipboard function in the second sub-area 2140, and when the electronic device 2100 detects a user selection, the electronic device 2100 may set a bookmark or clipboard function corresponding to the icon 2143 to a bookmark among contents such as a plurality of applications or web pages in at least one area (e.g., the first main area 2110) of the first main area 2110 and the second main area 2120 or may display contents stored at a clipboard in a list form.

In an embodiment, the electronic device 2100 may change a view format of contents that are set to a bookmark or stored at the clipboard. As shown in FIG. 21F, a view format of contents may be displayed in a thumbnail format.

According to various embodiments of the present invention, when the electronic device 2100 detects a user selection of the icon 2143 of a bookmark or clipboard function displayed in the second sub-area 2140, the electronic device 2100 may change and display a color thereof in order to represent activation.

According to various embodiments of the present invention, the electronic device 2100 may display contents formed with a plurality of pages such as a news screen or a book page on the first main area 2110 or the second main area 2120. The electronic device 2100 may provide the effect of moving to a next page onto the first sub-area 2130 or the second sub-area 2140 connected to the displayed area. In an embodiment, in order to represent the effect of moving to a next page on the first sub-area 2130 or the second sub-area 2140, the electronic device 2100 may display an image of a side surface of a book page and display a moving book page.

Figure 22:
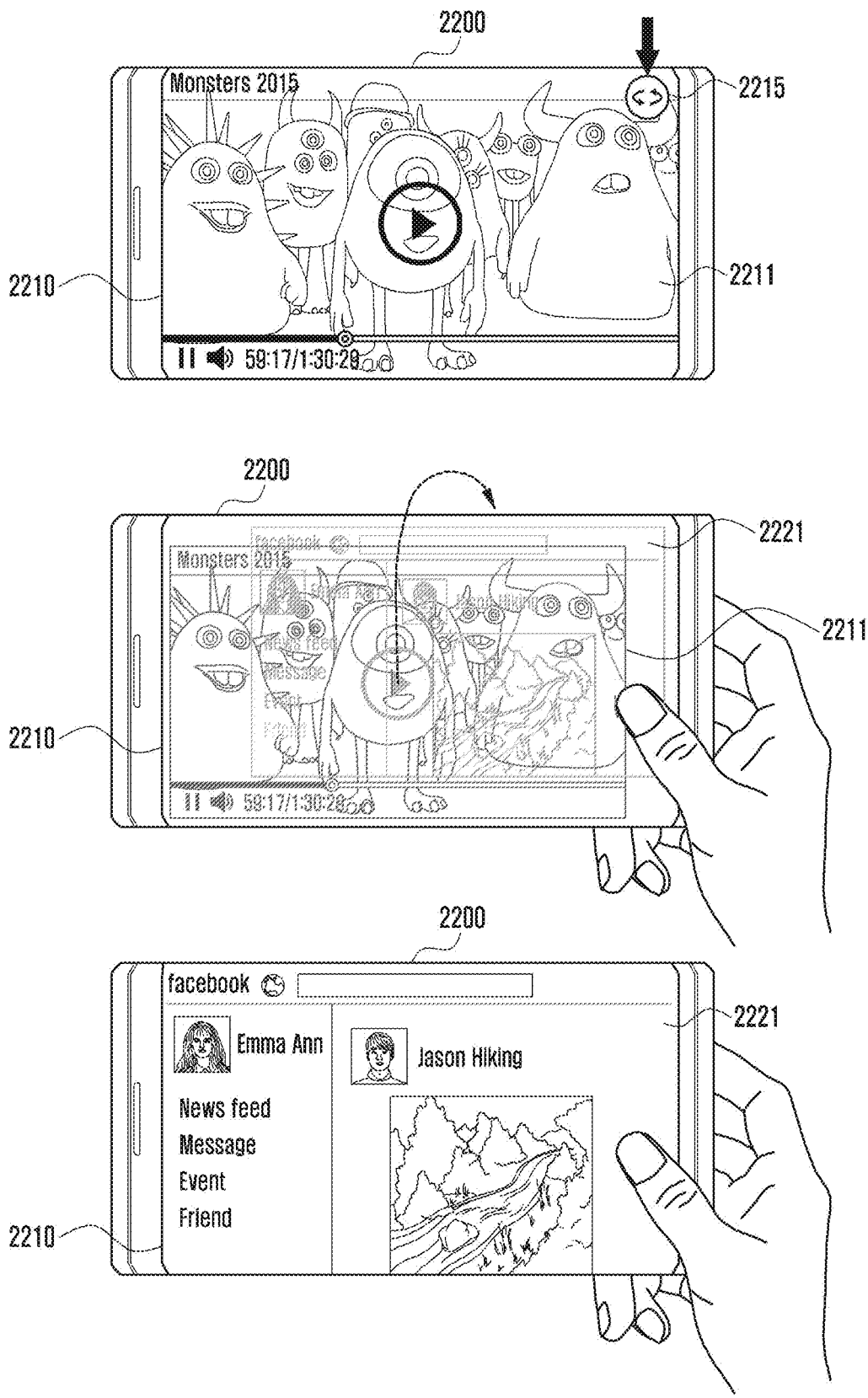
FIG. 22 is a diagram illustrating an electronic device having a flexible display according to various embodiments.

FIG. 22 is a diagram illustrating an operation using a flexible display in an electronic device according to various embodiments of the present invention.

With reference to FIG. 22, an electronic device 2200 may detect a screen conversion event. According to an embodiment, when contents are displayed in each of a first main area 2210 and a second main area 2220, if the electronic device 2200 detects a user selection of a screen conversion icon 2215 displayed on the first main area 2210 or the second main area 2220, the electronic device 2200 may detect a screen conversion event. A displayed location of the screen conversion icon 2215 may be changed according to detection of a user's holding position. When a user input is detected on the screen conversion icon 2215, the electronic device 2200 may translucently overlap and display on a content displayed in the first main area 2210 and a content displayed in the second main area 2220 and receive an input of a gesture that moves one of the contents toward the first main area 2210 from the user. The electronic device 2200 may display the selected content in the first main area 2210. A non-selected content may be displayed in the second main area 2220. Here, the first main area 2210 may be a user viewing area determined according to the user's holding position, and the second main area 2220 may be a non-viewing area of the user determined according to the user's holding position.

FIGS. 23A and 23B are diagrams illustrating an operation using a flexible display in an electronic device according to various embodiments of the present invention.

The electronic device may recognize at least one of peripheral external electronic devices and communicate with the recognized electronic device. The electronic device may communicate with the external electronic device through WiFi, Bluetooth, iBeacon, RF, and NFC.

In an embodiment, with reference to FIGS. 23A and 23B, an external electronic device 2350 may be a television. With reference to reference numeral 2360, the electronic device 2300 may display a user interface that can control a function related to the external electronic device 2350 in a first sub-area 2330 in response to a connection in communication with the external electronic device 2350. The user interface may be a user interface that can adjust a channel or a volume of the television, which is the external electronic device 2350.

With reference to reference numeral 2370, an electronic device 2300 may detect a user gesture in a direction of one area (e.g., the first main area 2310) of main areas from a first sub-area 2330 in which a user interface is displayed. The electronic device 2300 may extend and display the first sub-area 2330 or a user interface displayed in the first sub-area 2330 to a partial area of a main area (e.g., a first main area 2310) in which detection of a user gesture is terminated.

In an embodiment, the electronic device may extend the first sub-area 2330 to the entire first main area 2310 according to an area in which detection of the user gesture is terminated.

With reference to reference numeral 2380 of FIG. 23B, the electronic device 2300 may detect a screen conversion event. According to an embodiment, a user interface 2311 that can control a function related to a television, which is the external electronic device 2350 may be displayed in the first main area 2310, and a home screen 2321 of the electronic device may be displayed in the second main area (not shown).

According to an embodiment, the first main area 2310 may be a user viewing area determined according to the user's holding position, and the second main area may be an area in which the user does not view and determined according to the user's holding position.

The electronic device 2300 may respond to detection of selection of the user's screen conversion icon 2315 and display a home screen 2321 of the electronic device 2300 displayed in the second main area in the first main area 2310, as shown in reference numeral 2390. Further, the user interface 2311 that can control a function related to the external electronic device 2350 displayed in the first main area 2310 may be displayed in the second main area.

Figure 24:
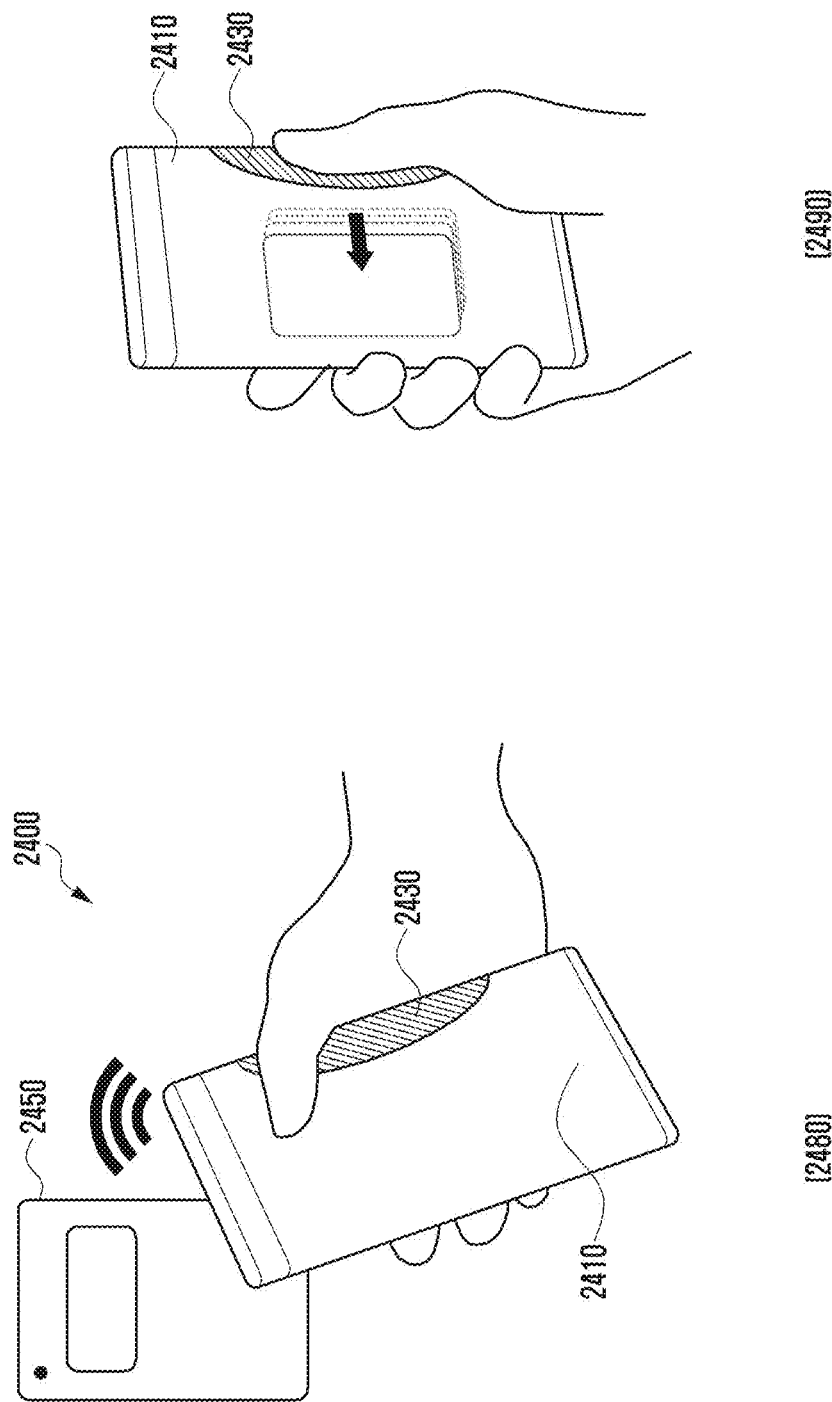
FIG. 24 is a diagram illustrating an electronic device having a flexible display according to various embodiments.

FIG. 24 is a diagram illustrating an operation using a flexible display in an electronic device according to various embodiments of the present invention.

According to an embodiment, with reference to reference numeral 2480, an electronic device 2400 may have a payment function. When the electronic device 2400 is tagged to a device 2450 that performs a payment function, such as point of sales (POS) of a store or is positioned adjacent to the POS, the electronic device 2400 may display a user interface that can control a payment function in a first sub-area 2430.

With reference to reference numeral 2490, the electronic device may display a card that can pay in the first sub-area 2430. When the card is selected by the user, the electronic device 2400 may move and display the selected card to one (e.g., a first main area 2410) of main areas. Further, the electronic device 2400 may display a user interface that requests user authentication for payment. The user may be authenticated through a user interface that requests user authentication displayed in the first sub-area 2430.

In the foregoing description, a flexible display of an electronic device and a method of operating the same according to an embodiment of the present invention have been described through the present specification and drawings and specific terms have been used, but exemplary embodiments disclosed in this specification and drawings are suggested as a specific example to easily describe the present invention and to help understanding thereof and do not limit the scope of the present invention. That is, various embodiments based on the technical concept in the present invention will be apparent to those of ordinary skill in the art.

The invention claimed is:

1. An electronic device, comprising:
   a flexible display; and
   at least one processor,
   wherein the flexible display including a first main area disposed at a front surface of the electronic device, a second main area disposed at a rear surface of the electronic device and a sub-area extended from the first main area and the second main area,
   wherein at least part of the sub-area has a rounded shape,
   wherein the at least one processor is configured to control to:
      display a plurality of icons corresponding to an application or a specific function in the sub-area of the flexible display,
      detect an input for selecting at least one icon of the plurality of icons in the sub-area in which the plurality of icons are displayed,
      detect a seamless swipe input of the selected at least one icon to the first main area or the second main area through the sub-area,
      execute the application or the specific function corresponding to the selected at least one icon, and
      display a screen according to the execution in one of the first main area or the second main area in which the swipe input is terminated, and
   wherein the at least one processor is further configured to control to:
      detect a seamless swipe input of a user interface displayed on the sub-area,
      extend the user interface to a partial or entire one of the first main area or the second main area in which the swipe input is terminated according to an area in which detection of the swipe input terminated,
      receive an input on a screen conversion icon, a position of the screen conversion icon changeable based on a holding position of a user of the electronic device,
      translucently overlap and display a first content and a second content on the first main area,
      receive a selection of one of the first content and the second content from the user, and
      in response to the selection, display the selected content on the first main area and display the unselected content on the second main area.

2. The electronic device of claim 1,
   wherein the sub-area is an area extended from one of the first main area and the second main area to enclose at least one side surface of the electronic device, and wherein, in the flexible display, the first main area, the second main area and the sub-area are integrally formed.

3. The electronic device of claim 2, wherein the sub-area includes:
a first sub-area comprising an area extended from the first main area and an area extended from the second main area spaced at a predetermined gap from the area extended from the first main area; and
a second sub-area extended from the first main area to be connected to the second main area.

4. The electronic device of claim 3, wherein the at least one processor is configured to control to terminate display of the second sub-area when detecting at least one of drag or swipe on the second sub-area of the flexible display configured to display a plurality of icons.

5. The electronic device of claim 2, wherein the sub-area comprises a curved surface in at least a portion thereof.

6. The electronic device of claim 1, wherein the at least one processor is configured to control to temporarily store data corresponding to a selected at least one content.

7. The electronic device of claim 1, wherein the at least one processor is configured to control to share, when another application is being executed in another main area in which a swipe input of a selected at least one content is detected, data of the selected at least one content with the other application.

8. The electronic device of claim 1, wherein the at least one processor is configured to control to:
detect a screen conversion input in a state in which a screen related to the application or the specific function is displayed in one of the first main area or the second main area in which the swipe input is detected, and
convert the displayed screen to a screen displayed in another main area based on the screen conversion input.

9. The electronic device of claim 1,
wherein the at least one processor is configured to control to:
display a plurality of plates configured to classify and display an object corresponding to a content on another main area when the swipe input is detected,
detect a selection input to one object displayed in one plate of the plurality of plates, to detect swipe to the other main area, and
display a content corresponding to the object in the other main area or to share data of the content, and
wherein the plurality of plates each correspond to an application or a function.

10. The electronic device of claim 1, wherein the sub-area of the flexible display configured to display the plurality of icons is extended in a direction of a drag input onto one of the first main area and the second main area.

11. The electronic device of claim 1, wherein the at least one processor is configured to control to change a color of at least one icon selected from the plurality of icons.

12. The electronic device of claim 1, further comprising a transceiver configured to communicate with an external electronic device,
wherein the at least one processor is configured to control to:
display a user interface corresponding to a function related to the external electronic device in the sub-area of the flexible display when the at least one processor detects a connection to an external electronic device,
detect an input on the displayed user interface, and
display information related to the external electronic device in one of the first main area or the second main area of the flexible display according to the detected input on the displayed user interface, and
controls the external electronic device according to the detected input on the displayed user interface.

13. The electronic device of claim 12, wherein the at least one processor is configured to control to change and display a location that displays a user interface corresponding to a function related to the external electronic device in the sub-area corresponding to a holding position detected by the electronic device.

14. The electronic device of claim 12, wherein the at least one processor is configured to control to:
detect an input on one of the first main area, the second main area or the sub-area,
extend one of the main areas or the sub-area according to the input on one of the main areas or the sub-area, and
display a user interface corresponding to a function related to the external electronic device in the extended area.

15. The electronic device of claim 12, wherein, when at least one of the external electronic device or the electronic device provides a reproduction function, the at least one processor is configured to control to display a user interface related to the reproduction function in the sub-area.

16. The electronic device of claim 12, wherein the at least one processor is configured to control to display a user interface corresponding to a function related to the external electronic device in the sub-area in one form of a landscape mode, portrait mode, two hand mode, or one hand mode according to a function or a service related to the external electronic device.

17. The electronic device of claim 12, wherein the at least one processor is configured to control to display a user interface corresponding to a function related to the external electronic device in at least one area of one of the first main area, the second main area or the sub-area of the flexible display of the electronic device according to a function or a service related to the external electronic device.

18. A non-transitory computer readable recording medium in which a program for executing a flexible display of an electronic device including a first main area disposed at a front surface of the electronic device, a second main area disposed at a rear surface of the electronic device, and a sub-area extended from the first main area and the second main area where the sub-area has a rounded shape and a method of operating the same is recorded, the program when executed by a computer causes the computer to perform operations of:
displaying a plurality of icons corresponding to an application or a specific function in the sub-area of the flexible display;
detecting an input for selecting at least one icon of the plurality of icons in the sub-area in which the plurality of icons are displayed;
detecting a seamless swipe input of the selected at least one icon to the first main area or the second main area through the sub-area;
executing the application or the specific function corresponding to the selected at least one icon;
displaying a screen according to the execution in one of the first main area or the second main area in which the swipe input is terminated;
detecting a selection input to at least one content on the screen displayed in the first main area or the second main area;

detecting a seamless swipe input of a user interface displayed on the sub-area;
extending the user interface to a partial or entire one of the first main area or the second main area in which the swipe input is terminated according to an area in which detection of the swipe input terminated;
receiving an input on a screen conversion icon, a position of the screen conversion icon changeable based on a holding position of a user of the electronic device;
translucently overlapping and displaying a first content and a second content on the first main area;
receiving a selection of one of the first content and the second content from the user; and
in response to the selection, displaying the selected content on the first main area and display the unselected content on the second main area.

19. The non-transitory computer readable recording medium of claim 18, further comprising:
based on a connection to an external device, changing a portion of the flexible display to operate in at least one of a portrait mode or a landscape mode.

\* \* \* \* \*